US012583090B2

(12) United States Patent
Thiele

(10) Patent No.: US 12,583,090 B2
(45) Date of Patent: Mar. 24, 2026

(54) CONSTRUCTION TOOL

(71) Applicant: 1406239 BC Ltd., Shawnigan Lake (CA)

(72) Inventor: Kyle Carl Valentine Thiele, Shawnigan Lake (CA)

(73) Assignee: 1406239 BC Ltd., Shawnigan Lake (CA)

( * ) Notice: Subject to any disclaimer, the term of this patent is extended or adjusted under 35 U.S.C. 154(b) by 336 days.

(21) Appl. No.: 18/310,429

(22) Filed: May 1, 2023

(65) Prior Publication Data

US 2024/0367302 A1 Nov. 7, 2024

(51) Int. Cl.

| | |
|---|---|
| ***B25F 1/00*** | (2006.01) |
| ***B25B 9/00*** | (2006.01) |
| ***B66F 15/00*** | (2006.01) |
| ***E04F 21/22*** | (2006.01) |

(52) U.S. Cl.

CPC .................. *B25F 1/00* (2013.01); *B25B 9/00* (2013.01); *B66F 15/00* (2013.01); *E04F 21/22* (2013.01)

(58) Field of Classification Search

CPC .... B25B 9/00; B25F 1/00; B66F 15/00; E04F 21/22

See application file for complete search history.

(56) References Cited

U.S. PATENT DOCUMENTS

| | | | | |
|---|---|---|---|---|
| 300,968 | A | 6/1884 | Hatfield | |
| 303,492 | A | 8/1884 | Crow | |
| 848,426 | A | 3/1907 | Bacon et al. | |
| 1,018,070 | A | 2/1912 | Morehead | |
| 2,132,553 | A | 10/1938 | Andrejchak | |
| 3,779,515 | A | 12/1973 | Larios et al. | |
| 4,290,582 | A | 9/1981 | Eckelkamp | |
| 4,493,477 | A * | 1/1985 | Greer | B25B 9/00 254/113 |
| 4,620,691 | A | 11/1986 | Waters, Jr. | |
| 5,190,266 | A | 3/1993 | Barrera | |
| 5,907,940 | A | 6/1999 | Eddie | |
| D485,477 | S | 1/2004 | Gaskins | |
| 6,962,179 | B1 | 11/2005 | Brodersen | |
| 2012/0085065 | A1 * | 4/2012 | Gelormino | E04F 21/22 52/749.1 |

* cited by examiner

*Primary Examiner* — Tyrone V Hall, Jr.

(74) *Attorney, Agent, or Firm* — Stephen M. De Klerk

(57) ABSTRACT

A construction tool and method of using the tool. The tool includes a handle connected with a claw by a pivot near the bottom of the handle. The claw engages with a workpiece by penetrating the workpiece with a tooth point that is angled back from the claw toward the pivot. An anchor on the handle may engage with the floor. Pulling the handle away from the workpiece pivots the handle away from the claw at the top of the handle and toward the claw at the bottom. With the claw engaged with the workpiece and the anchor engaged with the floor, pulling the handle pulls the claw toward the handle, pulling the workpiece toward the user. Where the workpiece is a wall frame, the tool may facilitate securing the wall frame with an exterior surface that is flush against a lower-level structure located below the wall frame.

28 Claims, 24 Drawing Sheets

CONSTRUCTION TOOL

FIELD

The present disclosure relates to construction of structures.

BACKGROUND

Securing wall frames during the construction of a building involves attaching the wall frame to the floor and adjacent walls using nails or screws. The process typically begins with laying out the wall frame on the floor, checking for squareness and making adjustments as needed. The frame is then raised into position and temporarily supported using braces or other devices until it can be secured in place.

During this process, the wall frame must be flush with the outside surface of the structure, which can be achieved using a technique known as tow-nailing. Tow-nailing involves driving a nail or screw through the siding or sheathing material on the outside of the wall, angled in towards the framing member, and into the top plate of the wall frame. Tow-nailing helps to urge the wall frame inward to provide a flush surface in line with the rest of the structure.

While tow-nailing can be an effective technique, it requires careful attention to detail and a high degree of precision to ensure that the resulting wall will be level and plumb. Additionally, over time, the repeated expansion and contraction of the wood through changes in temperature and humidity can cause the nails or screws to loosen, potentially compromising the stability of the structure.

Approaches to securing wall frames will depend on a range of factors, including specific requirements of the project, local building codes and regulations, and the preferences of the builder or contractor. Regardless of the method used, ensuring proper installation and secure attachment of the wall frames is critical to the long-term stability and safety of the structure.

SUMMARY

In view of the shortcomings of previous approaches to construction of structures, there is motivation to provide an improved construction tool. Herein provided is a construction tool and method for framing a structure or securing a workpiece. The method involves a handle connected to a claw by a pivot for gripping and engaging the workpiece. Pulling the handle away from the workpiece while the claw is engaged with the workpiece and a bottom end of the handle is anchored to the underlying surface pulls the workpiece towards the user. This method is useful for securing a wall frame to an underlying floor, facilitating alignment with lower-level wall frames.

The construction tool includes a handle connected to a claw through a pivot. The handle has a top and a bottom end, with a grip located near the top end for manipulation by a user. The pivot connects the handle and the claw near the bottom end of the handle and the proximal end of the claw. A claw head located on the claw at a distal end opposite the proximal end of the claw. An anchor is located near the bottom end of the handle for engaging the tool with a floor or other underlying surface during use.

The claw has a distal end opposite the proximal end along its length, and the distal end is far from the user during use. The pivot and anchor are located near the proximal end of the claw. The claw head, pivot, and anchor arrangement allows the user to actuate the handle grip from the proximal end while the claw head is engaged with the workpiece. The claw head can extend from, be connected with, be defined by or otherwise located on, the claw near the distal end.

The claw head has at least one tooth point for piercing the workpiece. The tooth point can be located on, defined by, connected to, or otherwise located on the claw head near the distal end of the claw. The tooth point extends from the claw head at a tooth angle, defining a tooth path for directing the tooth point into the workpiece, away from the claw head along the claw length, and towards the pivot of the tool, when the tooth point pierces the workpiece for engaging the claw head with the workpiece. The tooth path within the workpiece is consistent with the tooth angle at which the tooth point pierces the workpiece. The tooth point extends from the claw head near the distal end and is angled at the tooth angle to effectively and resiliently engage the workpiece. The tooth angle is offset from a claw height axis, which is perpendicular to the claw length. The tooth angle is directed towards the pivot and the proximal end of the claw. The tooth angle can be offset at an angle of 2.5°, 5°, 7.5°, 10°, 12.5°, 15°, 17.5°, 20°, or any appropriate angle.

In operation, actuating the tool by pulling on the handle applies a pulling force along the tooth path, directed into the workpiece and towards the user due to the tooth angle. The tooth path following the tooth angle makes it less likely for any unintentional upward movement to unseat the tooth point. Force applied to the claw head by pulling on the handle is directed away from the point of entry of the tooth point, strengthening the engagement between the tooth point and the workpiece for a resilient connection. Due to the tooth angle at which the tooth path enters the workpiece when the tooth point penetrates the workpiece, pulling force towards the user does not dislodge the tooth from the workpiece or facilitate sliding out. The tooth angle and path directed towards the proximal end provide a stronger and more resilient engagement with the workpiece when pulling the claw towards the user by actuating the tool. The tooth path and the resulting effective and resilient connection is in contrast to an approach involving a tooth angle parallel to the claw height axis or angled towards the distal end of the claw. A tooth path that is angled toward the proximal end is more effective than a perpendicular tooth path or a tooth path towards the distal end of the claw.

If the tooth point extended from the claw head at an angle towards the distal end of the claw body, pulling the workpiece towards the user during tool actuation would pull the tooth point out along the path it entered. The pulling force would be applied at an angle along the path of entry, causing the tooth to slide out and disconnect from the workpiece. The connection between the claw head and the workpiece would lack resilience and be loose if the tooth point angled towards the distal end of the claw. The tooth would slide out of the path and disconnect from the workpiece.

To engage the claw with a workpiece and anchor with a surface, the handle is positioned perpendicular to the claw. The tooth point of the claw head can be engaged with the workpiece by striking the claw or head with a hammer or similar object. A reinforced striking surface may be included on the claw for this purpose. Similarly, the anchor can be engaged with the surface by striking the handle. A reinforced striking surface may be included on the handle for this purpose.

To pull the workpiece towards the user and the pivot, the user pulls the handle grip while the anchor is engaged with the underlying surface and the tooth point is engaged with the workpiece. This pivots the handle away from the claw head at the top end and towards it at the bottom end, pulling the pivot and claw away from the workpiece. The tooth point remains engaged with the workpiece, urging the claw head and the connected workpiece towards the user.

In addition to the tooth point, the claw head may have one or more extra tooth points to engage with the workpiece. Each additional tooth point may be defined on or connected with the claw head, and extend from the claw head near the distal end of the claw. Each additional tooth point extends from the claw head at an additional tooth angle to pierce the workpiece at and additional tooth path within the workpiece. Each additional tooth angle may be the same, or there may be more than one additional tooth angle.

The additional tooth angles may each be the same or different from the tooth point angle. In some cases, the additional tooth angle is parallel to the claw height axis. The additional tooth angle may be offset from the claw height axis to direct the additional tooth point into the workpiece towards the pivot and proximal end of the claw for effective and resilient engagement with the workpiece. The additional tooth angle can be offset by various angles, such as 2.5°, 5°, 7.5°, 10°, 12.5°, 15°, 17.5°, 20° or any other suitable angle.

The anchor may be any suitable anchor that engages the handle with the floor or other underlying surface and prevents the handle from pivoting freely with respect to the claw when pivoted with respect to the claw. The anchor may include a feature for piercing, penetrating or otherwise pushing into the underlying surface, such as a spur, a stud, a claw, a spade, a peg, a point or a spike.

The anchor of the tool can also have a feature that provides a non-slip grip or frictional engagement with the underlying surface, without piercing or penetrating the underlying surface. This feature may include a stopper or a tread. A stopper is a mechanism or device that is designed to prevent movement or sliding on a surface, such as the floor, and provide stability or anchoring. The stopper may be used in conjunction with a wheel at the bottom of the handle, and may include a brake that prevents movement of the wheel when the stopper is engaged in a braking position with respect to the wheel, anchoring the handle through frictional engagement of the locked wheel with the floor or other underlying surface. A tread, on the other hand, is part of the tool or device that comes into contact with the floor or other underlying surface and provides traction or grip to resist movement of the handle, anchoring the handle through frictional engagement of the tread with the floor or other underlying surface.

During anchoring of the handle with the underlying surface, a thick rubber mat or a durable surface can be placed below the anchor to provide high-friction. This high-friction surface can engage with the anchor, securing it in place with the floor or underlying surface. Personnel, equipment or purpose-built anchors can provide the necessary weight to keep the temporary high-friction surface in place. The mat or temporary surface is secured on top of the underlying surface, ensuring that the anchor is similarly anchored through engagement with the mat or surface.

The pivot connects the handle to the claw by a pin through a pair of holes in the handle and the pivot. A connection pin may be included with the pivot, which sits in a hole through both the handle and the claw body. This connection pin may be flanged and is appropriately tight to allow for pivoting of the handle with respect to the claw. Additionally, the connection pin may be seated within a bearing that is located in both the handle and claw connection holes. The connection pin may be removable, which allows for easy dismantling of the tool by separating the handle from the claw for storage.

In some embodiments, the handle may have multiple handle adjustment holes distributed throughout its length. These holes permit users to disconnect the handle from the claw at one hole, and then reconnect it at another hole. This selection of different handle adjustment holes along the handle alters the pivot height where the claw is connected with the handle. Users can adjust the pivot height to work with workpieces that have varying elevation above the underlying surface.

In some embodiments, the claw may have multiple claw adjustment holes distributed along its length. These holes permit users to disconnect the claw from the handle at one hole, and then reconnect it at another hole. This selection of different claw adjustment holes along the claw adjusts the pivot distance where the claw is connected with the claw. Users can adjust the pivot distance to work with workpieces that have varying levels of clearance between the workpiece and available workspace for the user to position themselves. Similarly, users may select a position that is more proximal to the user along the claw length for greater leverage on the workpiece.

In some embodiments, both the handle and the claw have multiple adjustment holes distributed throughout their lengths. This feature allows for a wider range of applications by enabling users to adjust the practical working height and clearance of the tool. The handle adjustment holes permit application to different heights of workpieces, and different heights of engagement points of the workpiece by selecting an appropriate hole. The claw adjustment holes allow for one tool to be used in multiple applications that apply to different workpieces, and facilitate the application of one tool with varying amounts of clearance between the workpiece and the anchor at the bottom of the handle, by selecting an appropriate claw adjustment hole.

When framing houses, the construction tool can be used either at the top or the bottom of a wall frame to connect perpendicular wall frames. Additionally, the tool can be used for assembling timber or logs during construction, and for placing connections between wooden beams before securing them with nails or screws. The handle adjustment holes and height adjustment have particular application when assembling logs or irregular timbers that may be of varying sizes.

In a first aspect, herein provided is a construction tool and method of using the tool. The tool includes a handle connected with a claw by a pivot near the bottom of the handle. The claw engages with a workpiece by penetrating the workpiece with a tooth point that is angled back from the claw toward the pivot. An anchor on the handle may engage with the floor. Pulling the handle away from the workpiece pivots the handle away from the claw at the top of the handle and toward the claw at the bottom. With the claw engaged with the workpiece and the anchor engaged with the floor, pulling the handle pulls the claw toward the handle, pulling the workpiece toward the user. Where the workpiece is a wall frame, the tool may facilitate securing the wall frame with an exterior surface that is flush against a lower-level structure located below the wall frame.

In a further aspect, herein provided is a construction tool comprising: a handle body extending between a first handle end and a second handle end; a claw body extending along a claw length of the claw body between a first claw end and a second claw end, the claw body connected with the handle body by a pivot proximate the second handle end and proximate the second claw end for pivoting the handle body with respect to the claw body; an anchor located on the handle body proximate the second handle end for securing the handle body with an underlying surface; a claw head located on the claw body proximate the first claw end for engaging with a workpiece; and a tooth point extending from the claw head at a tooth angle for piercing the workpiece. The tooth angle is offset from a tooth axis perpendicular to the claw length, and angled away from the first claw end and toward the second claw end for facilitating engagement between the tooth point and the workpiece along a tooth path within the workpiece, which tooth path is directed away from the first claw end and toward the second claw end.

In some embodiments, the anchor is configured to secure the handle body with the underlying surface by penetrating the underlying surface. In some embodiments, the anchor is configured to secure the handle body with the underlying surface by frictionally engaging the underlying surface. In some embodiments, the tooth angle is offset from the tooth axis by up to about 20°. In some embodiments, the tooth angle is offset from the tooth axis by an angle selected from the group consisting of 2.5°, 5°, 7.5°, 10°, 12.5°, 15°, 17.5° and 20°. In some embodiments, the construction tool includes a handle strike plate located on the handle body for receiving a forceful blow to facilitate engaging the anchor with the underlying surface. In some embodiments, the handle strike plate is located along the handle body intermediate the first body end and the pivot. In some embodiments, the handle strike plate is located along the handle body intermediate the second body end and the pivot. In some embodiments, the construction tool includes a claw strike plate located on the claw body intermediate the first body end and the pivot for receiving a forceful blow to facilitate engaging the tooth point with the workpiece. In some embodiments, the pivot is configured for disassembling the tool by disconnecting the handle body from the claw body and reassembling the tool by connecting the handle body with the claw body. In some embodiments, the construction tool includes a plurality of handle adjustment holes defined in the handle body proximate the second handle end; wherein the pivot comprises one of the handle adjustment holes; and the construction tool is configured to be assembled with the pivot comprising any one of the handle adjustment holes for selecting a position along the handle body for the pivot. In some embodiments, the construction tool includes a plurality of claw adjustment holes defined in the claw body proximate the second claw end; wherein the pivot comprises one of the claw adjustment holes; and the construction tool is configured to be assembled with the pivot comprising any one of the claw adjustment holes for selecting a position along the claw body for the pivot. In some embodiments, the construction tool includes an additional tooth point extending from the claw head at an additional tooth angle for piercing the workpiece along an additional tooth path corresponding to the additional tooth angle. In some embodiments, the additional tooth point is separated from the tooth point along the claw body by an offset distance for offsetting a location on the workpiece at which the tooth point engages with the workpiece from an additional location on the workpiece at which the additional tooth point engages with the workpiece. In some embodiments, the offset distance is a selected from the group consisting of 1.5 cm, 2.0 cm, 2.5 cm, 3.0 cm, 3.5 cm, 4.0 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, 10.5 cm, and 11.0 cm. In some embodiments, the additional tooth angle is parallel to the additional tooth axis. In some embodiments, the additional tooth angle is offset from an additional tooth axis perpendicular to the claw length, and angled away from the first claw end and toward the second claw end for defining the additional tooth path within the workpiece directed away from the first claw end and toward the second claw end. In some embodiments, the additional tooth angle is equal to the tooth angle. In some embodiments, the additional tooth angle is offset from the additional tooth axis by up to about 20°. In some embodiments, the additional tooth angle is offset from the additional tooth axis by an additional angle selected from the group consisting of 2.5°, 5°, 7.5°, 10°, 12.5°, 15°, 17.5° and 20°.

In a further aspect, herein provided is a method of securing a workpiece comprising: providing a tool comprising a claw engaged with a handle by a pivot, the handle including an anchor below the pivot; engaging the claw with the workpiece; engaging the anchor with an underlying surface; and pivoting the handle with respect to the claw for urging the workpiece toward the pivot. The claw head comprises a tooth point positioned at a tooth angle directed toward the pivot for facilitating engagement between the tooth point and the workpiece along a tooth path angled toward the pivot.

In some embodiments, the workpiece comprises a wall frame. In some embodiments, engaging the claw with the workpiece comprises striking the claw with a blunt tool. In some embodiments, engaging the anchor with the underlying surface comprises piercing the underlying surface with the anchor. In some embodiments, engaging the claw with the workpiece comprises striking the claw with a blunt tool. In some embodiments, engaging the anchor with the underlying surface comprises frictionally engaging the underlying surface with the anchor. In some embodiments, the method includes selecting a height of the claw prior to engaging the claw with the workpiece. In some embodiments, the method includes selecting a distance from the tooth point to the pivot along the claw prior to engaging the claw with the workpiece.

Other aspects and features of the present disclosure will become apparent to those ordinarily skilled in the art upon review of the following description of specific embodiments in conjunction with the accompanying figures.

BRIEF DESCRIPTION OF THE FIGURES

Embodiments of the present disclosure will now be described, by way of example only, with reference to the attached Figures. In the attached Figures, features sharing a common final pair of numerals with a different first digit or digits correspond to equivalent features across embodiments shown in different figures (e.g. the claw 30, the claw 130, the claw 230, the claw 330, the claw 430, etc.).

DETAILED DESCRIPTION

Figure 1:
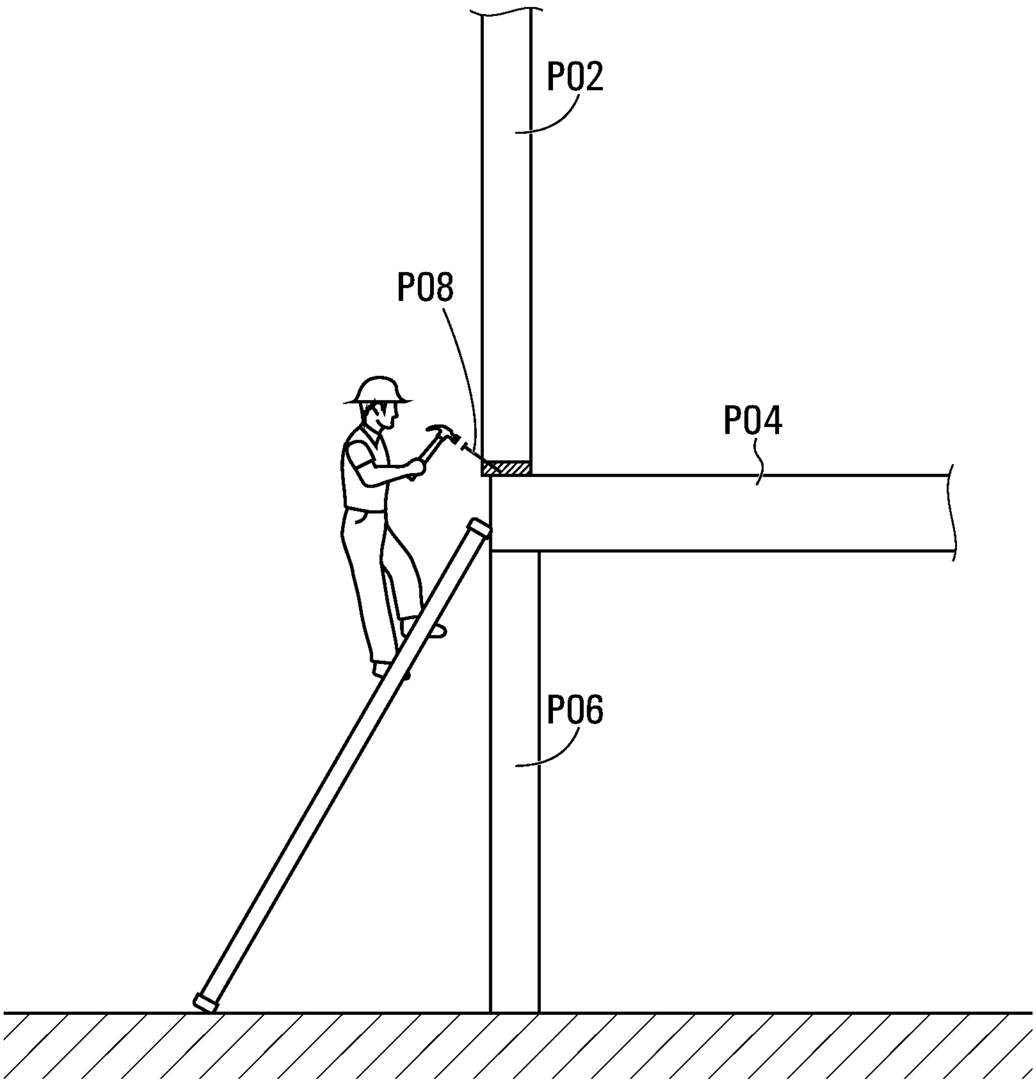
FIG. 1 Prior Art
FIG. 1 is a schematic of a previous approach to securing a wall frame when building a structure.

Generally, the present disclosure provides a construction tool and method of using the construction tool to facilitate framing a structure or otherwise placing a workpiece. The construction tool and method may be applied to securing structure frames when framing a building or otherwise securing a workpiece. The construction tool includes a handle for gripping by a user. The handle is handle connected with a claw by a pivot. When the claw is engaged with the workpiece, and a bottom end of the handle is engaged with an underlying surface, actuation of the handle by pulling the handle away from the workpiece pulls the workpiece toward the user. For example, where the workpiece is a wall frame and the underlying surface is a floor in a building being framed, pulling the wall frame inward may facilitate securing the wall frame in a desired location, such as with an exterior surface that is aligned with, and flush against, a lower-level wall frame located below the wall frame.

The construction tool includes a handle connected with a claw by a pivot. A top end of the handle is opposite a bottom end of the handle along a handle length of the handle. A handle grip is located proximate to the top end of the handle for being gripped and manipulated by a user in operation. The handle is connected with a claw by a pivot proximate to the bottom end of the handle and proximate to a proximal end of the claw. A distal end of the claw is opposite the proximal end of the claw along a claw length of the claw. The proximal end of the claw is proximal to a user of the tool when in use. An anchor is located proximate to the bottom end of the handle for engaging the handle with a floor or other underlying surface when the tool is in use.

The handle grip may extend from the handle proximate the top end of the handle, be defined on the handle proximate the top end of the handle, be connected with the handle proximate the top end of the handle or otherwise located on the handle proximate the top end of the handle. The handle grip may be located proximate the top of the handle at the top end of the handle or within a proximate distance from the top end of the handle. A proximate distance from the top end of the handle may generally be between the top end of the handle and a midpoint of the handle along a handle length of the handle.

The anchor may extend from the handle proximate the bottom end of the handle, be defined on the handle proximate the bottom end of the handle, be connected with the handle proximate the bottom end of the handle or otherwise located on the handle proximate the bottom end of the handle. The anchor may be located proximate the bottom of the handle at the bottom end of the handle or within a proximate distance from the bottom end of the handle. A proximate distance from the bottom end of the handle may generally be between the bottom end of the handle and a midpoint of the handle along a handle length of the handle.

A claw head is located proximate to a distal end of the claw for engaging with a wall frame or other workpiece when in operation. The claw head may extend from the claw proximate the distal end of the claw, be defined on the claw proximate the distal end of the claw, be connected with the claw proximate the distal end of the claw or otherwise located on the claw proximate the distal end of the claw. The claw head may be located proximate the first end of the claw at the distal end of the claw or within a proximate distance from the distal end of the claw. A proximate distance from the distal end of the claw may generally be between the distal end of the claw and a midpoint of the claw along the claw length of the claw.

The distal end of the claw is opposite the proximal end of the claw along the claw length of the claw. The distal end of the claw is distal from a user of the tool when in use. The handle is connected with the claw by the pivot proximate the bottom end of the handle and proximate the proximal end of the claw. The arrangement of the claw head proximate the distal end of the claw, and the pivot and anchor proximate the proximal end of the claw allows the user to grip the handle grip and actuate the hand from the proximal end of the claw while the claw head at the distal end of the claw is engaged with the wall frame or other workpiece.

The claw head includes at least one tooth point for piercing the wall frame or other workpiece when the claw is engaged with the wall frame or other workpiece. The tooth point may extend from the claw head, be defined on the claw head, be connected with the claw head or otherwise located on the claw head proximate the distal end of the claw. The tooth point may be located proximate the first end of the claw at the distal end of the claw or within a proximate distance from the distal end of the claw. A proximate distance from the distal end of the claw may generally be between the distal end of the claw and a midpoint of the claw along the claw length of the claw.

The tooth point may be defined on the claw head, be connected with the claw head or otherwise located on the claw head such that the tooth point extends from the claw head proximate the distal end of the claw. The tooth point extends from the claw head at a tooth angle to facilitate effective and resilient engagement by the tooth point with the wall frame or other workpiece during operation of the tool. The tooth angle is offset from a claw height axis parallel to a claw height of the claw, which claw height is perpendicular to the claw length. The tooth angle is offset from the claw height axis at an angle that directs the tooth point away from the distal end of the claw, toward the pivot and toward the proximal end of the claw. The tooth angle may be offset from the claw height axis by an angle of about 2.5°, 5°, 7.5°, 10°, 12.5°, 15°, 17.5°, 20° or any suitable angle.

Extension of the tooth point from the claw head at the tooth angle directs the tooth point into the workpiece along a tooth path consistent with the tooth angle at which the tooth point pierces the workpiece. The tooth angle and the tooth path are directed both into the workpiece, away from the claw head along the claw length, and back from the distal end of the claw toward the proximal end of the claw, and toward the pivot of the tool.

Pulling on the claw upon actuation applies pulling force along the tooth path, which due to at the tooth angle, is directed into the workpiece and toward the user. The pulling force is toward the proximal end, and as a result is away from point of entry of the tooth point into the workpiece, facilitating a stronger engagement between the tooth point and the workpiece, providing an effective and resilient connection between the claw head and the workpiece. The pulling force applied to the tooth point is toward the user along the tooth path, and such force would not directly pull the tooth out of the workpiece or otherwise facilitate the tooth point sliding out of the workpiece and disconnect from the workpiece.

Any unintentional upward movement applied to the tool may be less likely to unseat the tooth point as a result of the tooth path following the tooth angle, and the resulting tooth path of the tooth point entering into the workpiece at the tooth angle, in contrast with an approach that involves a tooth angle that is parallel with the claw height axis or that angles from the claw height axis toward the distal end of the claw. As a result of the tooth angle and the tooth path being directed toward the proximal end of the claw, once the tooth point is embedded in the workpiece, the tooth angle provides a stronger, more effective and more resilient engagement with the workpiece when pulling the claw towards the user by actuating the tool than would be the case if the tooth angle were perpendicular to the claw length and parallel to the claw height axis, or if the tooth point extended from the claw head at an angle from the claw height axis toward the distal end of the claw body.

If the tooth point extended from the claw head at an angle toward the distal end of the claw body, then the tooth point would be pulled out of the workpiece along the path of entry along which the tooth point entered the workpiece when pulling the workpiece towards the user during actuation of the tool by pulling the top end of the handle toward the user. In this case, then pulling force upon actuation would be applied at an angle along the same path of entry that the tooth point entered the workpiece, and the tooth would be able to slide out of the workpiece along the path of entry and disconnect from the workpiece. The connection between the claw head and the workpiece would be loose and lack resilience when used in the context of the tool if the tooth point extended from the claw head at an angle that points angled toward the distal end of the claw, as the tooth point would then slide out of the path into which the tooth point entered the workpiece at an angle toward the distal end of the claw.

In operation, the handle may be positioned generally perpendicularly with respect to the claw to facilitate engaging the claw with a wall frame or other work piece, and to facilitate engaging the anchor at the bottom end of the handle with the floor or other underlying surface. The tooth point of the claw head may be engaged with the wall frame or other workpiece by striking the claw generally, or the claw head specifically, with a hammer or other blunt object to force the tooth point into the wall frame or other workpiece. A reinforced claw striking surface may be included on the claw to receive blows from the hammer or other blunt object. The anchor may be engaged with the floor or other underlying surface by striking the handle. A reinforced handle striking surface may be included on the handle to receive blows from the hammer or other blunt object.

Once the tooth point is secured with the wall frame or other workpiece, and the anchor is secured with the floor or other underlying surface, the tool may be actuated to pull the wall frame toward the pivot and toward the user. Pulling the wall frame toward the pivot and toward the user may facilitate locating the wall frame flush with other aspects of the overall structure being framed for securing the wall frame in place appropriately.

To pull the wall frame toward the pivot and toward the user, the handle may be pulled by the user at the handle grip located at the top end of the handle while the anchor is engaged with the floor or other underlying surface and the tooth point is engaged with the wall frame or other work piece. Pulling the top end of the handle toward the user pivots the handle away from the claw head at the top end of the handle and pivots the bottom end of the handle toward the claw head. Where the anchor is engaged with the floor or other underlying surface, the motion of the bottom end of the handle pivoting toward the claw head as a result of leverage applied to the handle in turn pulls the pivot, and the claw connected with the pivot, away from the wall frame or other workpiece. Pulling the pivot and the claw connected with the pivot away from the wall frame or other work piece while the tooth point on the claw head is connected with the wall frame or other work piece urges the claw head, and the workpiece connected with it, toward the user.

The claw head includes the tooth point and may also include one or more additional tooth points for piercing the workpiece and engaging with the workpiece. The additional tooth point may be defined on the claw head, be connected with the claw head or otherwise located on the claw head such that the additional tooth point extends from the claw head proximate the distal end of the claw. The additional tooth point extends from the claw head at an additional tooth angle.

Where the claw head includes the tooth point and one more additional tooth points, the tooth point is angled back toward the pivot and the proximal end of the claw to provide the tooth path. Any additional tooth points on the claw head may extend from the claw head at the additional tooth angle such that the additional tooth point pierces the workpiece along an additional tooth path at the same angle as the tooth angle and the tooth path, or at any other angle. In some embodiments, the additional tooth angle is not directed from the claw head toward the second claw end to facilitate effective and resilient engagement by the additional tooth point with the wall frame or other workpiece during operation of the tool. In some cases, the additional tooth angle is parallel to the claw height axis.

Similarly to the tooth angle, the additional tooth angle may be offset from the claw height axis parallel to the claw height of the claw, which claw height is perpendicular to the claw length. Similarly to the tooth angle, the additional tooth angle may offset from the claw height axis at an angle that directs the additional tooth point into a workpiece along a path that is directed toward the pivot and toward the proximal end of the claw, to facilitate effective and resilient engagement by the additional tooth point with the wall frame or other workpiece during operation of the tool. The additional tooth angle may be offset from the claw height axis by an angle of about 2.5°, 5°, 7.5°, 10°, 12.5°, 15°, 17.5°, 20° or any suitable additional tooth angle.

The anchor may be any suitable anchor that engages the handle with the floor or other underlying surface and prevents the handle from pivoting freely with respect to the claw when pivoted with respect to the claw. The anchor may include a feature for piercing, penetrating or otherwise pushing into the underlying surface, such as a spur, a stud, a claw, a spade, a peg, a point or a spike. A spur includes a small, pointed projection that is designed to engage with a surface, including the floor, by piercing the surface to and provide stability or anchoring. A stud includes a small, pointed projection or protuberance that is designed to grip or anchor to a surface, including the floor to and provide stability or anchoring. A claw includes a sharp, curved projection or prong that is designed to penetrate, grip or latch onto a surface, including the floor to and provide stability or anchoring. A spade includes a tool or device that has a flat, pointed blade or spike that is designed to penetrate and anchor into a surface, including the floor to and provide stability or anchoring. A peg includes a small, cylindrical or pointed object that is designed to be inserted, pressed or forced into, and anchored with, a surface, including the floor to and provide stability or anchoring. A point and a spike each include a sharp or pointed projection or tip that is designed to penetrate and anchor into a surface, including the floor, to provide stability or anchoring.

The anchor may include a feature for gripping or otherwise frictionally engaging with the underlying surface without piercing the underlying surface, such as a stopper or a tread. A stopper includes a device or mechanism that is designed to prevent movement or sliding on a surface, including the floor, and provide stability or anchoring. The stopper may be applied in conjunction with a wheel at the bottom of the handle. The stopper may include a brake that prevents movement of the wheel when the stopper is actuated into a braking position with respect to the wheel, anchoring the handle through frictional engagement of a locked wheel with the floor or other underlying surface. A tread includes part of a tool or device that comes into contact with the floor or other underlying surface and provides traction or grip to resist movement of the handle, anchoring the handle through frictional engagement of the tread with the floor or other underlying surface.

A thick rubber mat or other high-friction and durable surface may be placed below the anchor, and the anchor may pierce and engage with, or frictionally engage with, the high-friction surface during anchoring of the handle with the underlying surface. In such cases, body weight of personnel, weight of equipment or weight of purpose-built anchors may secure the temporary high-friction surface with the floor or other underlying surface. Since the mat or other temporary high-friction surface is secured on top of the floor or other underlying surface, the anchor is similarly anchored with the floor or other underlying surface through engagement between the anchor and the mat or other temporary high-friction surface.

The handle extends along the handle length from the top end to the bottom end of the handle. The claw extends along the claw length from the distal end to the proximal end of the claw. The pivot is located proximate the bottom end of the handle along the handle length and proximate the distal end of the claw along the claw length. The pivot is seated in a hole through the handle and a hole through the pivot. The pivot is a connection point between the handle and the claw. The pivot may include a connection pin. The connection pin is seated in a hole through the handle and a hole through the claw body at a tightness appropriate to allow the handle to pivot with respect to the claw. The connection pin may be a flanged pin or other suitable connection pin. The connection pin may be seated within a bearing that is seated within a handle connection hole through the handle body and also within a claw connection hole through the claw body. The connection pin may be a removable connection pin, facilitating dismantling of the tool by separating the handle from the claw for storage.

In some embodiments, the handle may include a plurality of handle adjustment holes distributed along the handle length. The plurality of handle adjustment holes allows a user to disconnect the handle from the claw at a first handle adjustment hole then reconnect the handle with the claw at a second handle adjustment hole. Selecting a different handle adjustment hole on the handle allows a user to select a different height along the handle at which the pivot connects with the claw, which in turn allows a user to select a pivot height along the handle at which the claw is pivotally connected with the handle. Selecting the pivot height allows the user to work with workpieces that have varying elevation above the underlying surface.

In some embodiments, the claw may include a plurality of claw adjustment holes distributed along the claw length. The plurality of claw adjustment holes allows a user to disconnect the claw from the claw at a first claw adjustment hole then reconnect the claw with the handle at a second claw adjustment hole. Selecting a different claw adjustment hole on the claw allows a user to select a different distance along the claw from the workpiece and from the user at which the pivot connects with the claw, which in turn allows a user to select a pivot distance along the claw at which the claw is pivotally connected with the claw. Selecting the pivot distance between positions that are distal from the user and proximal to the user allows the user to work with workpieces that have varying levels of clearance between the workpiece and available work space for the user to position themselves. Similarly, the user may choose a position that is more proximal to the user along the claw length for greater leverage on the work piece.

In some embodiments, the handle includes the plurality of handle adjustment holes distributed along the handle length and the claw includes the plurality of claw adjustment holes distributed along the claw length. Some construction applications may require varying heights of claw heads and varying clearance between a worker and a frame or other workpiece. The handle adjustment holes and claw adjustment holes together facilitate a wider range of applications with a particular tool by facilitating situation-specific practical working height and working clearances at which to engage the workpiece with the claw. The handle adjustment holes facilitate application to different heights of workpieces, and different heights of an engagement point of the workpiece, by selection of a handle adjustment hole. The claw adjustment holes facilitate use of one individual tool in multiple application that apply to different workpieces. The claw adjustment holes facilitate application of one individual tool with differing amounts of clearance between the workpiece and the anchor at the bottom of the handle, by selection of a claw adjustment hole.

Where the construction tool is used for framing houses, the construction tool may be used on the top or the bottom of a wall frame when being used to frame houses to connect wall frames that are perpendicular to each other. The construction tool may also be used for assembling timber or logs during construction. Similarly, any connections between wooden beams may be placed before securing with nails or screws using the tools. The handle adjustment holes the height adjustment may have particular application to assembly of logs or of irregular timbers that may be different sizes.

Figure 2:
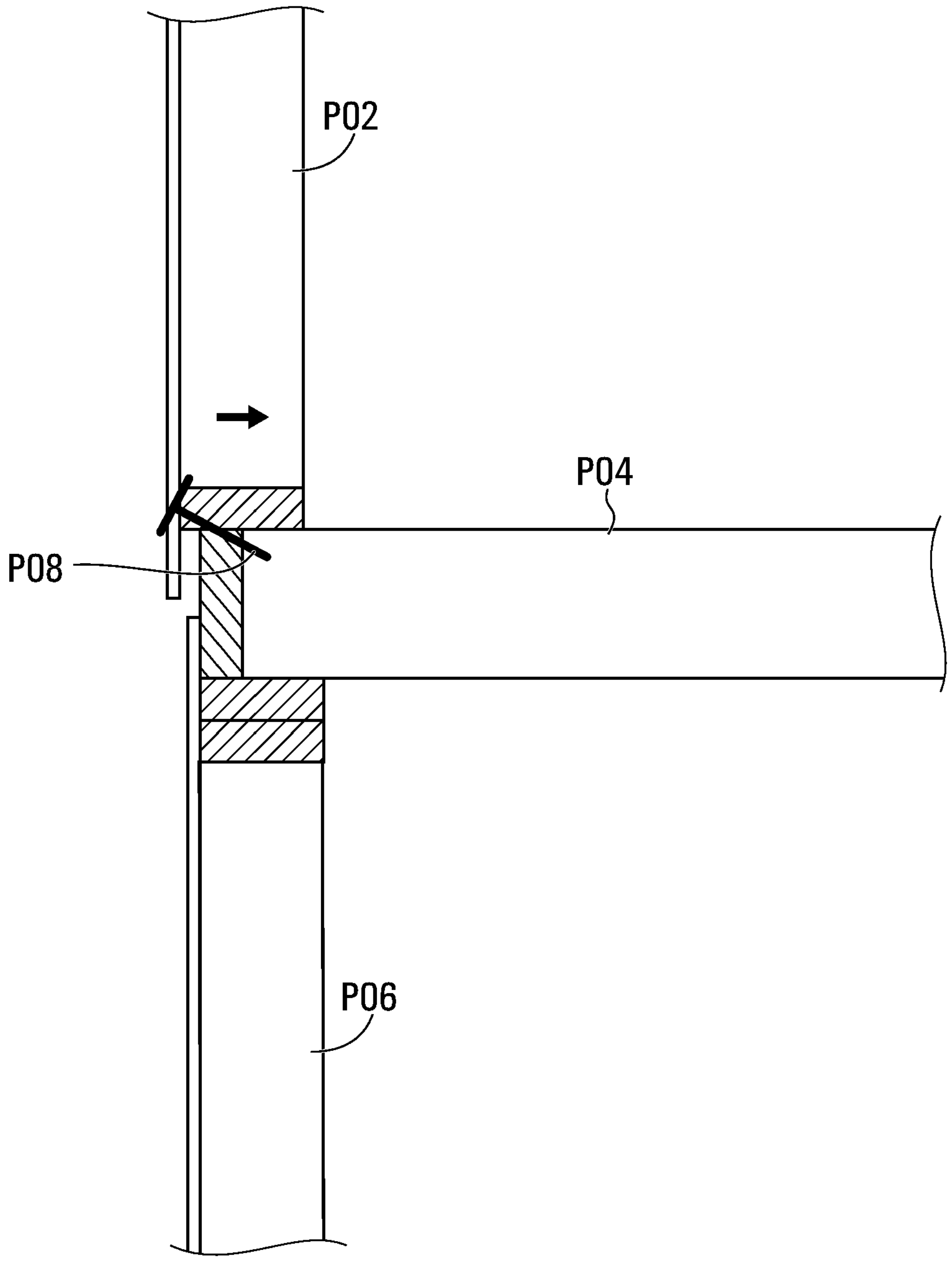
FIG. 2 Prior Art
FIG. 2 is a schematic of a detail view of the previous method of FIG. 1.

FIGS. 1 and 2 show a previous approach to assembling a building frame. In FIGS. 1 and 2, a first-story wall frame P02 rests on top of a first-story floor P04 and a ground-level wall P06. A tow nail P08 is hammered into the outside of the first-story wall P01 to urge the first-story wall P01 inward relative to the structure and ensure that the first-story wall P01 is flush with the ground-level wall P06 when the first story wall P01 is secured with the first-story floor P04 and the ground-level wall P06.

The previous approach shown in FIGS. 1 and 2 is subject to drawbacks in terms of safety and efficiency, particularly at heights above the first story, where lifting equipment is needed to safely access the outside wall, increasing cost and extending timelines for construction. Where tow nails are used on second or higher stories, there may also be difficulty, depending on the available construction infrastructure, in securing a second-story wall frame effectively flush with a first-story wall frame.

Figure 3:
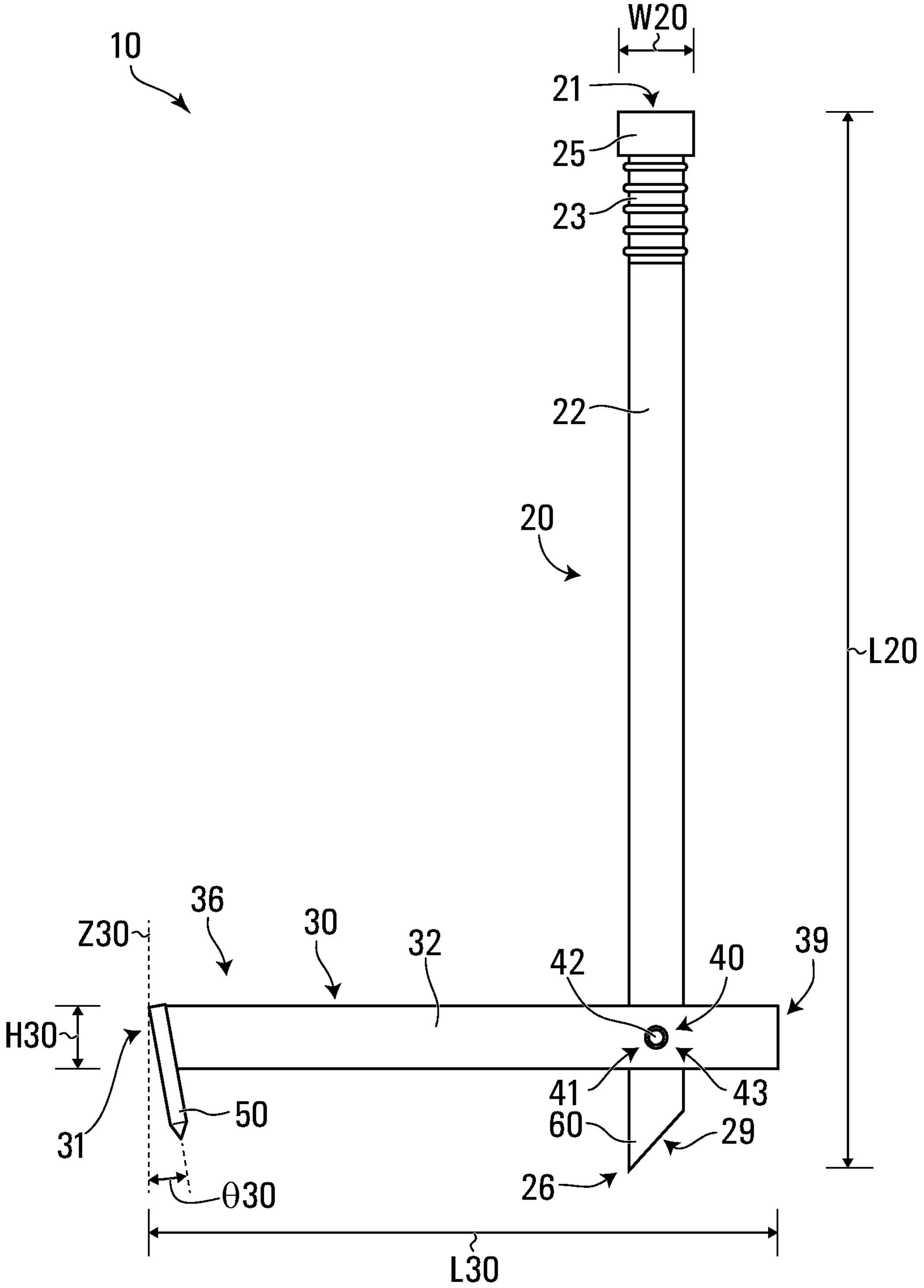
FIG. 3 is an elevation view of a construction tool.
Figure 4:
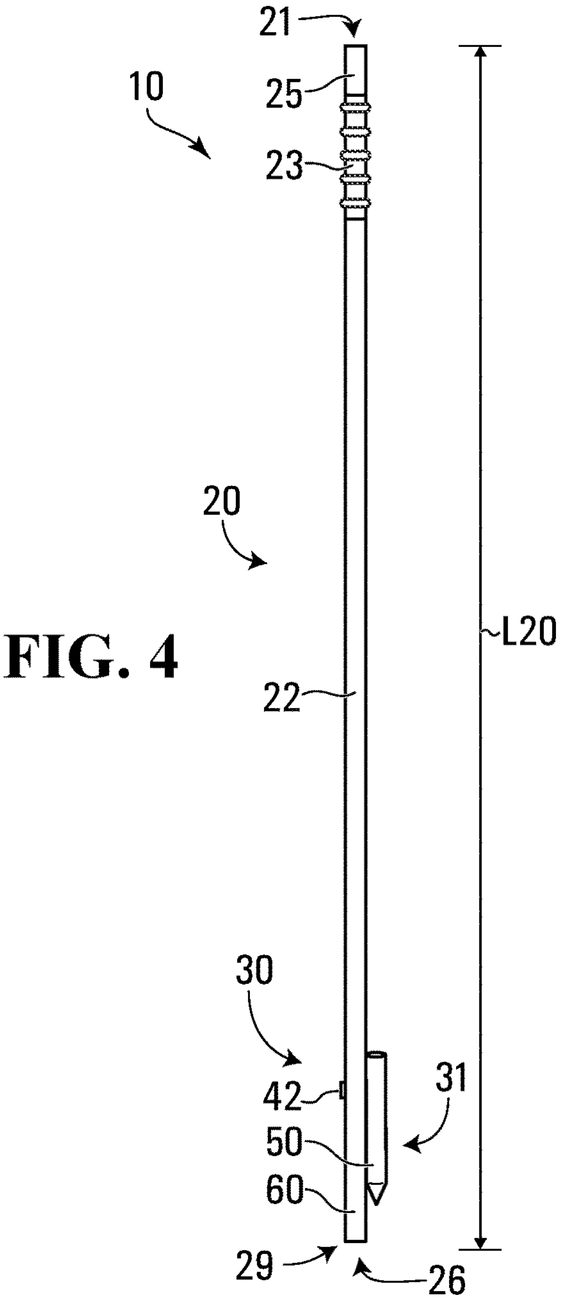
FIG. 4 is an elevation view of the tool of FIG. 3 rotated 90 degrees.
Figure 5:
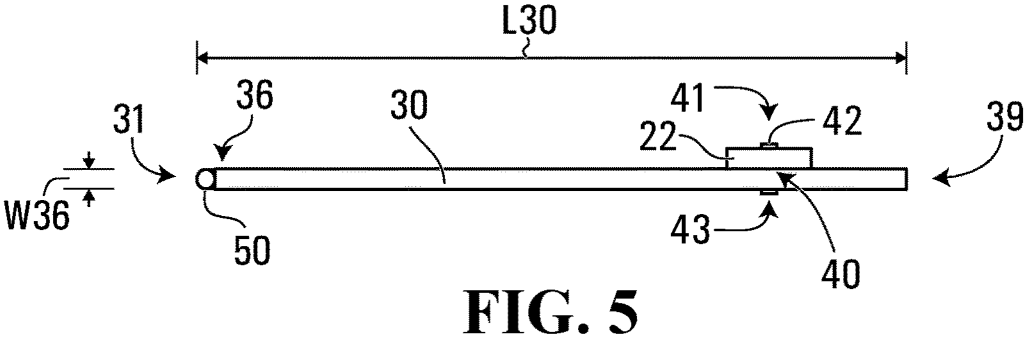
FIG. 5 is a plan view of the tool of FIG. 3.
Figure 6:
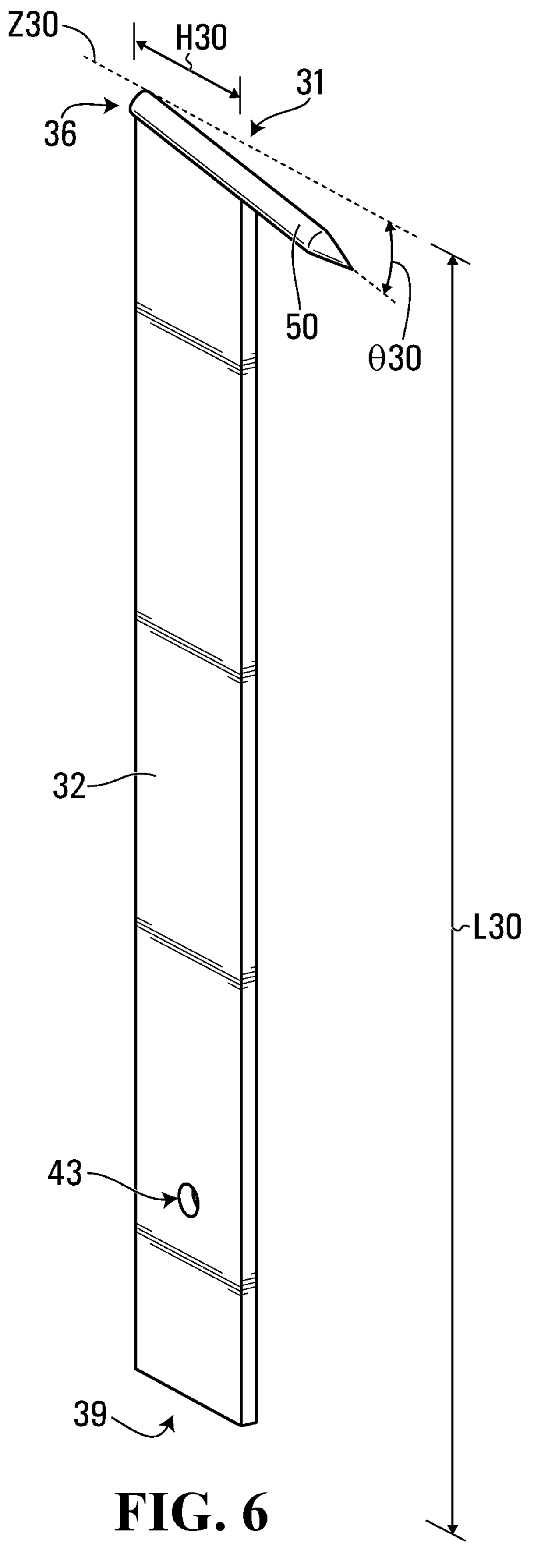
FIG. 6 is an isometric view of a claw head of the tool of FIG. 3.

FIGS. 3 to 5 show a construction tool 10 in a resting position. The construction tool 10 includes a handle 20 connected with a claw 30 by a pivot 40. FIG. 6 shows the claw 30.

The handle 20 includes a handle body 22 extending along a handle length L20 between a first handle end 21 and a second handle end 29. In ordinary use, the first handle end 21 would be the top of the handle body 22 and the second handle end 29 would be the bottom of the handle body 22. A handle grip 23 and a handle guard 25 are located on the handle body 22 proximate the first handle end 21 for gripping and manipulating the construction tool 10 when in use. An anchor 26 is located on the handle body 22 proximate the second handle end 29 for anchoring the handle 20 with a floor or other underlying surface on which the tool 10 is deployed. The anchor 26 includes a spike 60 for piercing the floor or other underlying surface when engaging with the floor or other underlying surface for anchoring the handle with the floor or other underlying surface.

The claw 30 includes a claw body 32 extending along a claw length L30 between a first claw end 31 and a second claw end 39. In ordinary use, the first claw end 31 would be the distal end of the claw body 32 from the user, and the second claw end 39 would be the proximal end of the claw body 32 to the user. The claw body 32 defines a claw height H30 that is perpendicular to the claw length L30. A claw head 36 is defined on the claw body 32 proximate the first claw end 31. The claw head defines a claw head width W36 that is perpendicular to the claw length L30 and to the claw height H30.

The claw head 36 includes a single tooth point 50 located on the claw head 36 along the claw head width W36. The tooth point 50 extends from the claw head 36 in a configuration including at least a portion of the tooth point 50 extending from the claw head 36 at a tooth angle θ30 to pierce the wall frame or other workpiece along a tooth path. The tooth angle θ30 may be angled at an offset from a claw axis Z30. The claw axis Z30 is perpendicular to the claw length L30 of the claw body 32 and parallel to the claw height H30 of the claw body 32.

The tooth angle θ30 is angled at an offset from the claw axis Z30, away from the first claw end 31 and toward the second claw end 39, for facilitating strong and resilient engagement of the tooth point 50, the claw head 36, the claw 30 and the tool 10 generally, with the wall frame or other workpiece. A strong and resilient engagement facilitates the tooth point 50, the claw head 36, the claw 30 and the tool 10 generally remaining engaged with the wall frame or other workpiece during pivoting of the handle 20 with respect to the claw 30, as shown in FIGS. 6, 7, 9 and 10, or other manipulation of the tool 10, and accompanying urging of the claw 30 away from the wall frame or other work piece while the handle 20 is anchored with the floor or other underlying surface.

The tooth point 50 may be located on the claw head 36 such that the tooth point 50 extends from the claw head 36 proximate the first end 31 of the claw body 32. The tooth point 50 extends from the claw head 36 at a tooth angle θ30 to facilitate effective and resilient engagement by the tooth point 50 with the wall frame or other workpiece during operation of the tool 10. The tooth angle θ30 is offset from the claw axis Z30 for orienting the tooth point 50 away from the first end 31 of the claw body 32, toward the pivot 40 and toward the second end 39 of the claw body 32. The tooth angle θ30 may be offset from the claw axis Z30 by an angle of about 2.5°, 5°, 7.5°, 10°, 12.5°, 15°, 17.5°, 20° or any suitable angle for easily and effectively penetrating the workpiece to provide an effective and resilient connection between the claw head 36 and the workpiece during operation of the tool 10.

The pivot 40 is a connection point between the handle 20 and the claw 30. The pivot 40 includes a connection pin 42. The connection pin 42 is seated in a handle connection hole 41 through the handle body 22, and in a claw connection hole 43 in the claw body 32, at a tightness appropriate to allow the handle 20 to pivot with respect to the claw 30. The connection pin 42 may be a flanged pin or other suitable connection pin. The connection pin 42 may be seated within a bearing that is seated within the holes through the handle body 22 and the claw body 32 (bearing not shown).

The connection pin 42 may be removable to allow the construction tool 10 to be disassembled for storage and transportation, and to be sold as a kit of parts including the handle 20, the claw 30 and the connection pin 42, which may be assembled into the construction tool 10.

The height of the pivot 40 along the handle length L20 and the position of the pivot 40 along the claw length L30 may be selected based on an expected height for the claw 30 on the handle 20, and an expected distance between the handle 20 and a workpiece to which the claw 30 will be secured for a particular application. For example, the position of the pivot 40 may be selected to effectively allow positioning of standardized framing wall frames. In some embodiments, the first-story wall frame P02 in the method of FIGS. 9 and 10 may be a standardized wall frame. Positioning the pivot 40 lower along the handle length L20 toward the second handle end 29 or more distal from the workpiece along the claw length L30 toward the second claw end 39 may facilitate application of greater amounts of leverage on the handle 20 when the construction tool 10 is in use.

Figure 7:
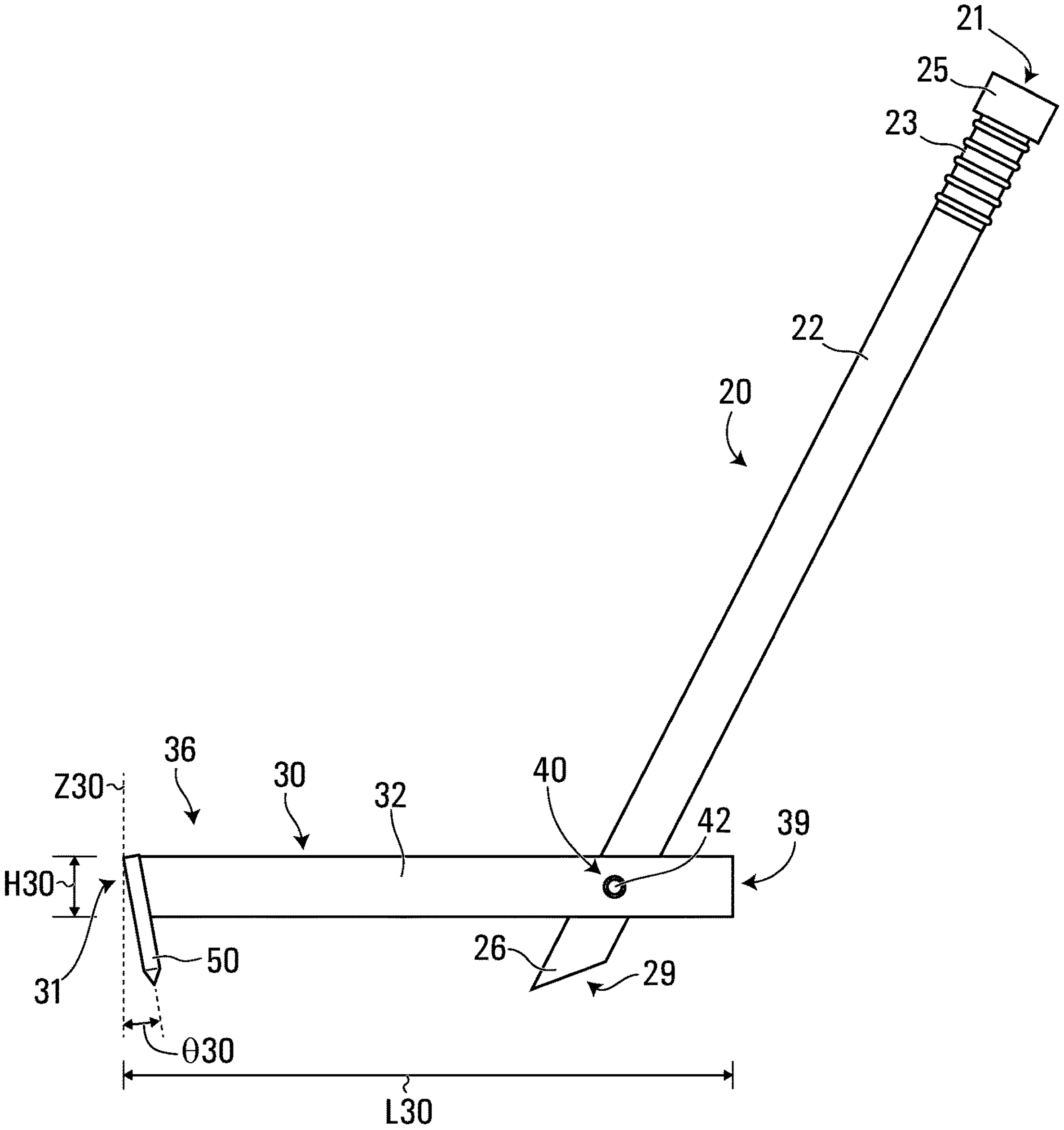
FIG. 7 is an elevation view of the tool of FIG. 3 in an actuated position.
Figure 8:
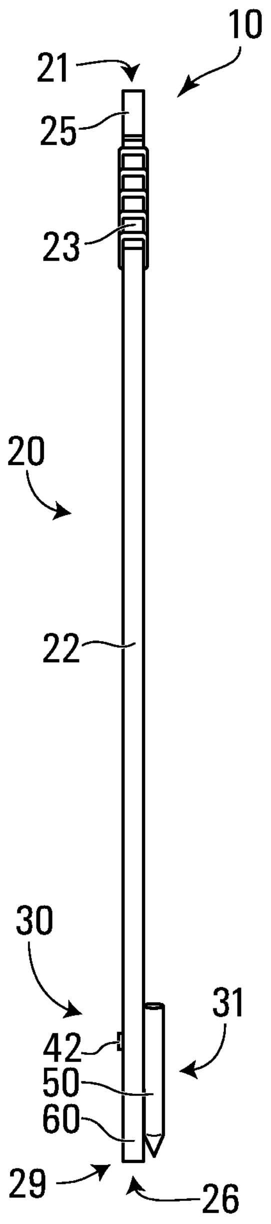
FIG. 8 is an elevation view of the tool of FIG. 3 rotated 90 degrees in the actuated position.

FIGS. 7 and 8 show the construction tool 10 in an actuated position. In the actuated position, the handle 20 has been pivoted to draw the first handle end 21 away from the claw head 36 and from the claw 30 generally. In the actuated position, the second handle end 29 is urged toward claw head 36. If the anchor 26 is secured with a floor or other underlying surface and the claw head 36 is secured with a house frame or other workpiece, then the handle 20 cannot freely pivot about the pivot 40 independently of the claw 30, and the claw head 36 will be pulled toward the pivot 40 when the tool 10 is actuated.

Figure 9:
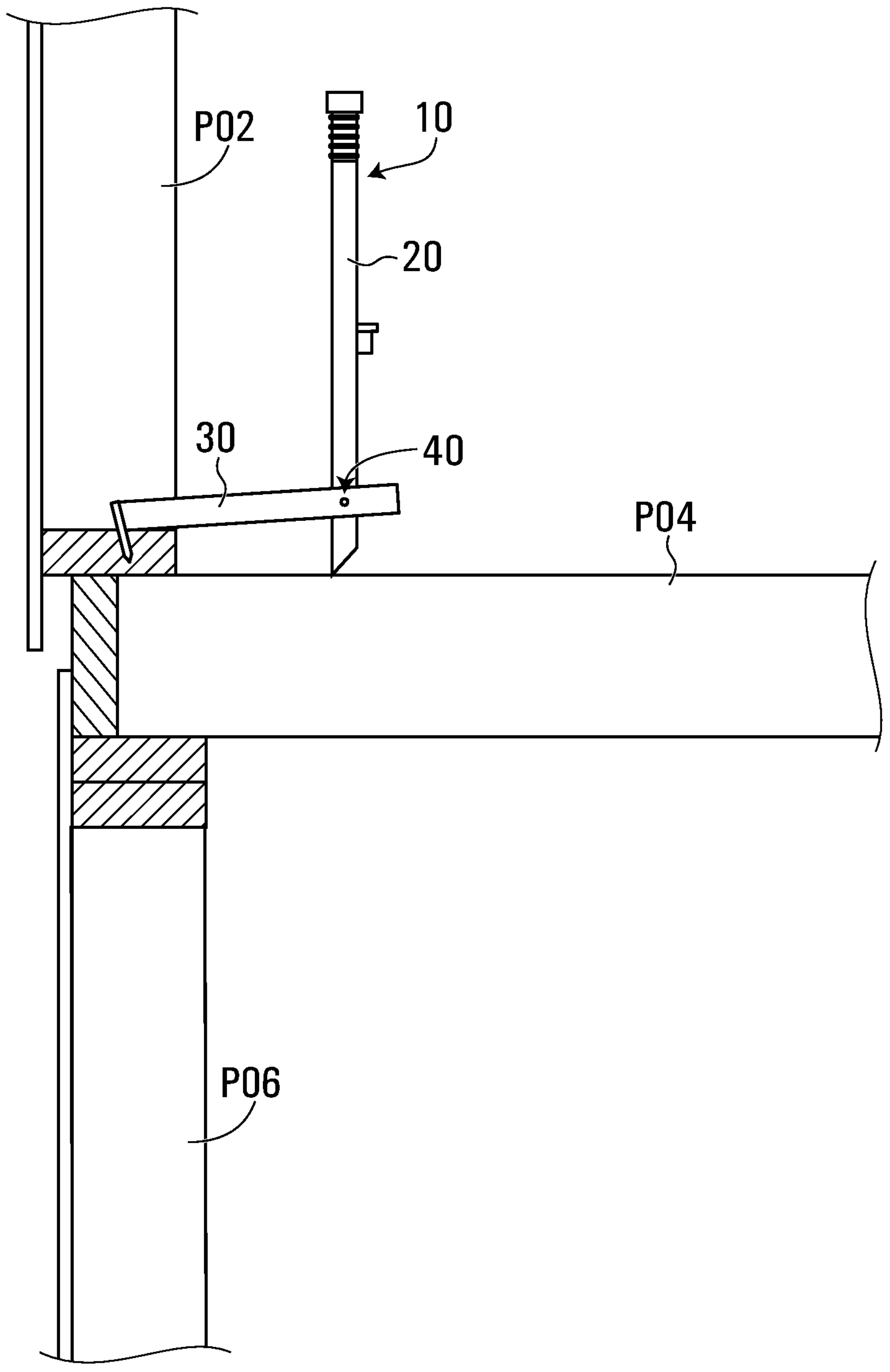
FIG. 9 is a method of using the tool of FIG. 3.
Figure 10:
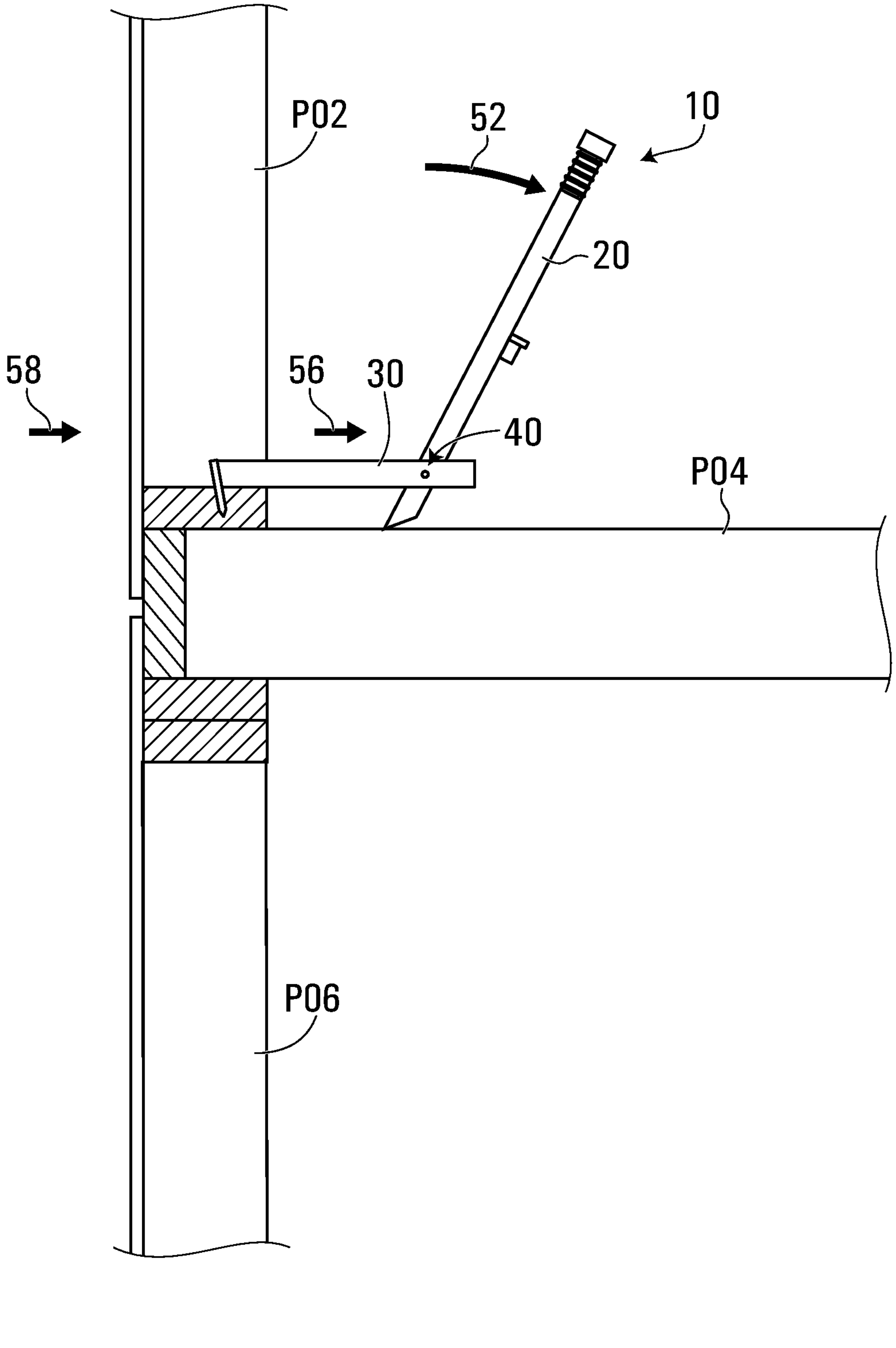
FIG. 10 is the method of FIG. 9 when the tool is in an actuated position.
Figure 11:
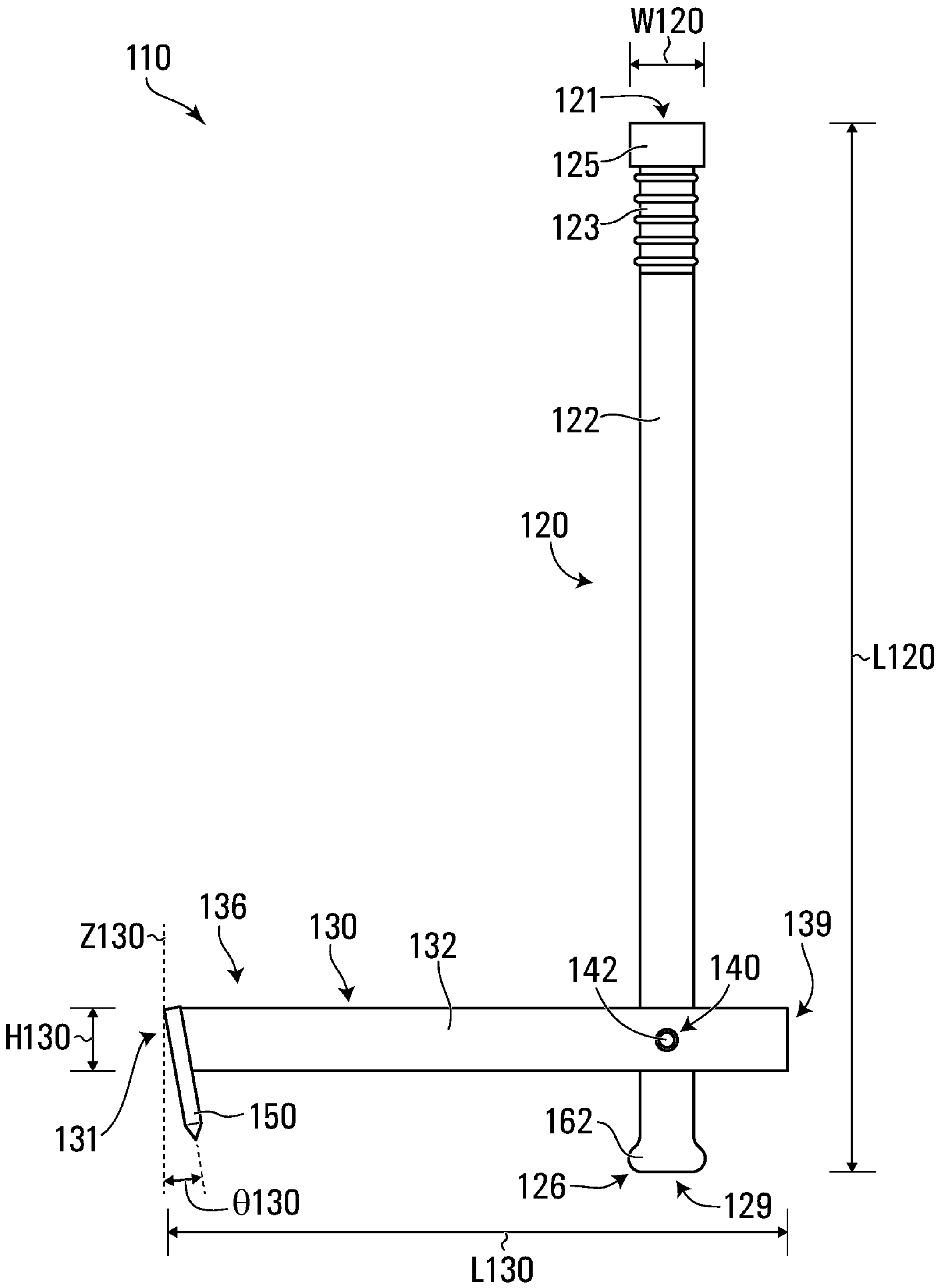
FIG. 11 is an elevation view of a construction tool with two tooth points.
Figure 12:
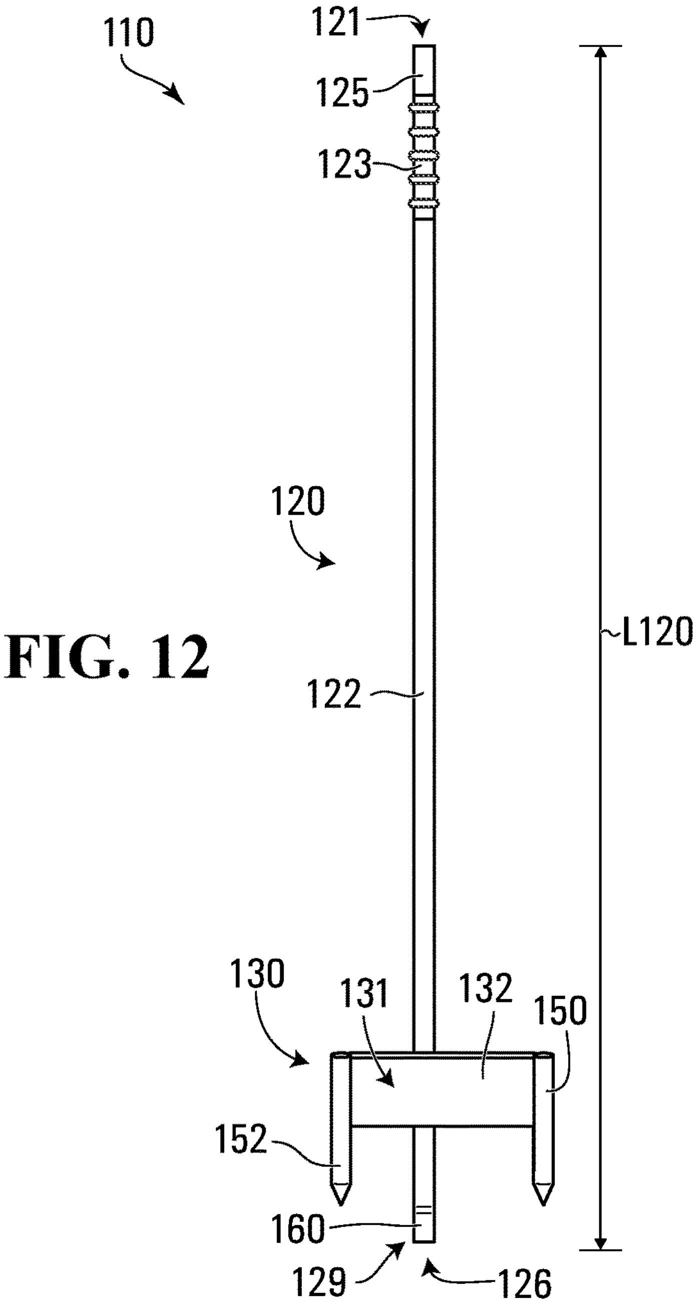
FIG. 12 is an elevation view of the tool of FIG. 11 rotated 90 degrees.
Figure 13:
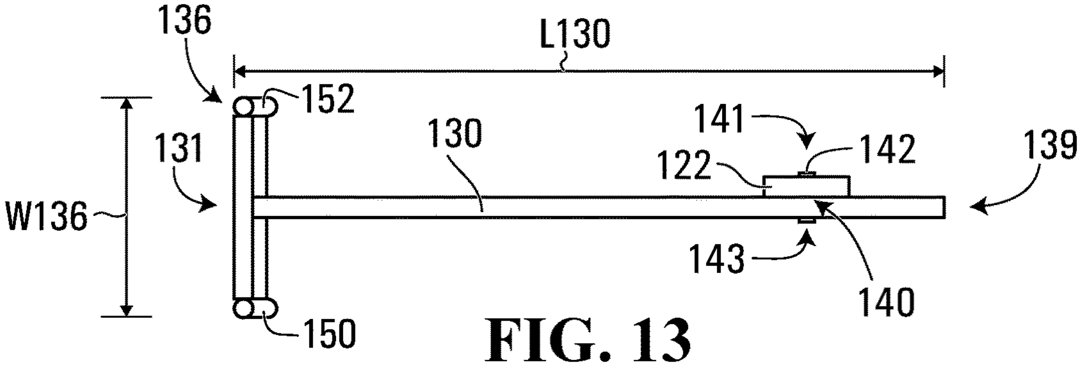
FIG. 13 is a plan view of the tool of FIG. 11.
Figure 14:
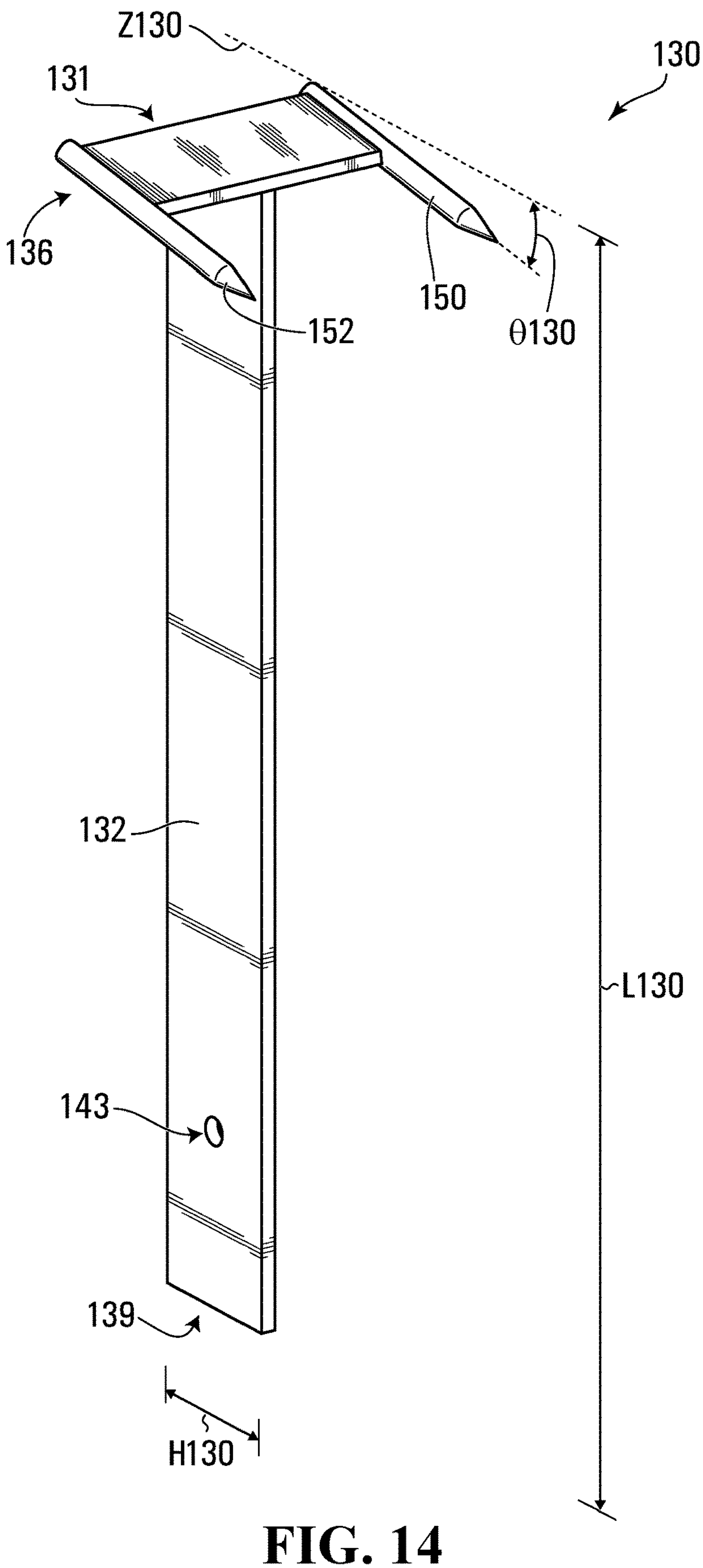
FIG. 14 is an isometric view of a claw head of the tool of FIG. 11.

FIGS. 9 and 10 show the construction tool 10 in use to secure the first-story wall frame P02 in place. The first-story wall frame P02 rests on top of the first-story floor P04 and the ground-level wall P06. The first-story wall frame P02 must be secured with the first-story floor P04 such that an exterior surface of the first-story wall frame P02 is flush with an exterior surface of the ground-level wall P06.

In FIG. 9, the construction tool 10 has been secured with the first-story wall frame P02 and with the first-story floor P04. To secure the construction tool 10 in the first-story wall frame P02 for pulling in the first-story wall frame P02, the claw head 36 must be secured with the first-story wall frame P02 and the anchor 26 must be secured with the first-story floor P04. The claw head 36 is positioned over a base timber of the first-story wall frame P02 and a hammer or other tool, or a user's foot, hand, knee or other direct manipulation, is used to apply force to the claw head 36, forcing the claw head 36 into the first-story wall frame P02 and securing the claw 36 head with the first-story wall frame P02. The anchor 26 is positioned over the first-story floor P04 then a hammer or other tool, or a user's hand, shoulder or other direct manipulation, is used to apply force to the handle 20, forcing the anchor 26 into engagement with the first-story floor P04, securing the anchor 26 with the first-story floor P04.

In FIG. 10, the construction tool 10 has been secured with the first-story wall frame P02 and with the first-story floor P04 as in FIG. 9. In contrast to FIG. 9, the construction tool 10 has been actuated to pull the first-story wall frame P02 inward relative to the overall structure being built, which facilitates placing the first-story wall frame P02 in a position such that the exterior surface of the first-story wall frame P02 aligns with the exterior surface of the ground-level wall frame P06, as shown in FIG. 10. In contrast, in FIG. 9, the exterior surface of the first-story wall frame P02 does not align with the exterior surface of the ground-level wall frame P06. Instead, in FIG. 9, before actuation of the construction tool 10, the exterior surface of the first-story wall frame P02 is displaced outward relative to the exterior surface of the ground-level wall frame P06.

The construction tool 10 pulls the first-story wall frame P02 inward by drawing the claw head 36 toward the anchor 26. The handle 20 is drawn away from the claw 30 by radial pulling motion 52, which pivots the handle 20 relative to the claw 30. The anchor 26 is engaged with the immobile first-story floor P04 and a corresponding pivot motion 54 of the anchor 26 toward the claw 30 does not result in translation of the anchor 26 across the first-story floor P04. Instead, corresponding planar pulling motion 56 of the claw 30 away from the first story wall frame P02 accompanies radial pulling motion 52 and the pivot motion 54.

The claw head 36 is embedded in the first-story wall frame P02 and the first-story wall frame P02 is mobile. As a result, the planar pulling motion 56 pulls the first story wall frame P02 along pulling motion path 58. As the first-story wall frame P02 is pulled inward along pulling motion path 58, the exterior surface of the first-story wall frame P02 aligns with the exterior surface of the ground-level wall frame P06, facilitating securing the first-story wall frame P02 in a position wherein the exterior surface of the first-story wall frame P02 is flush with the exterior surface of the ground-level wall frame P06. Any other metric in addition to in place of ensuring that two wall frames may similarly be facilitated where the goal of a particular aspect of construction is to locate pieces in relation to each other.

Pulling the first-story wall frame P02 inward facilitates locating the first-story wall frame P02 in a position such that exterior surface of the first-story wall frame P02 aligns with, and is flush with, the exterior surface of the ground-floor wall frame P06. Similarly, in other applications, any workpiece being positioned may be pulled toward a user of the construction tool 10 for positioning the workpiece in relation to other features, or for accomplishing other goals relevant to construction or other projects.

The method shown in FIGS. 9 and 10 may be practiced with the construction tool 10 or with any other suitable construction tool as described herein, including the construction tool 110, the construction tool 210, the construction tool 310, the construction tool 410, and all other embodiments of the construction tool as described herein.

FIGS. 11 to 14 show the construction tool 110 in the resting position. The construction tool 110 includes the handle 120 connected with the claw 130 by the pivot 140. FIG. 6 shows the claw 130.

The handle 120 includes the handle body 122 extending along the handle length L120 between the first handle end 121 and the second handle end 129. In ordinary use, the first handle end 121 would be the top of the handle body 122 and the second handle end 129 would be the bottom of the handle body 122. The handle grip 123 and the handle guard 125 are located on the handle body 122 proximate the first handle end 121 for gripping and manipulating the construction tool 110 when in use. The anchor 126 is located on the handle body 122 proximate the second handle end 129 for anchoring the handle 120 with the floor or other underlying surface on which the tool 110 is deployed.

The anchor 126 includes a tread 162 for frictionally engaging with the underlying surface when the handle 120 is actuated away from the claw head 136. The tread 162 anchors the handle 120 with the underlying surface without piercing the underlying surface and is suitable for use when piercing the underlying surface is not a practical option in the circumstances, such as when working on stone or concrete floors. The tread 162 may include rubber, or other materials conducive to frictional engagement with a floor or other underlying surface, particularly where the floor or underlying surface is smooth The claw 130 includes the claw body 132 extending along the claw length L130 between the first claw end 131 and the second claw end 139. In ordinary use, the first claw end 131 would be the distal end of the claw body 132 from the user, and the second claw end 139 would be the proximal end of the claw body 132 to the user. The claw body 132 defines the claw height H130 that is perpendicular to the claw length L130. The claw head 136 is defined on the claw body 132 proximate the first claw end 131. The claw head defines the claw head width W136 that is perpendicular to the claw length L130 and to the claw height H130.

The claw head 136 includes the tooth point 150 and an additional tooth point 152. The tooth point 150 and the additional tooth point 152 are each located on the claw head 136 along the claw head width W136. The tooth point 150 extends from the claw head 136 in a configuration including at least a portion of the tooth point 150 extending from the claw head 136 at the tooth angle θ130 to pierce the wall frame or other workpiece along the tooth path. The tooth angle θ130 may be angled at an offset from the claw axis Z130. The claw axis Z130 is perpendicular to the claw length L130 of the claw body 132 and parallel to the claw height H130 of the claw body 132.

Figure 15:
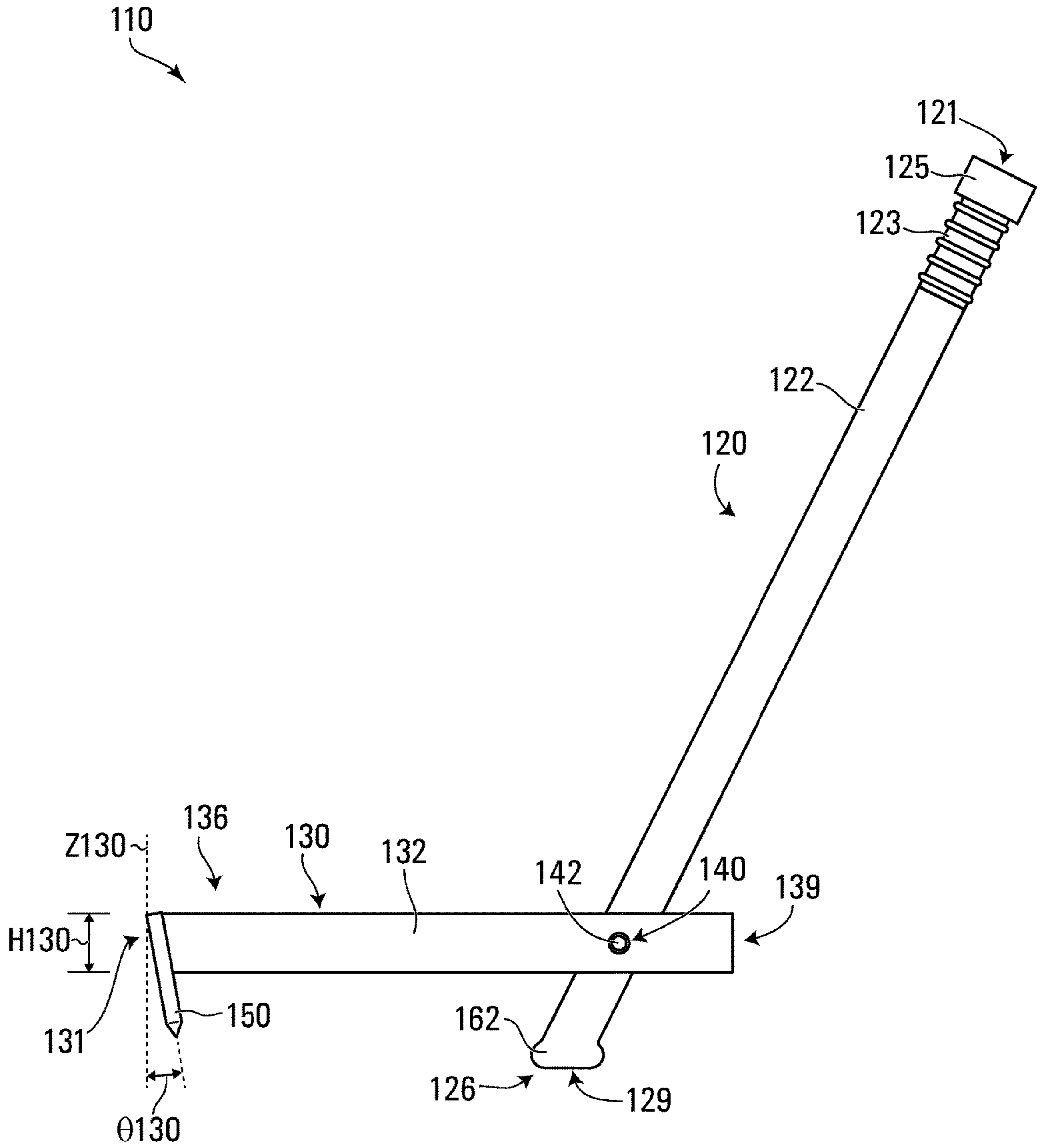
FIG. 15 is an elevation view of the tool of FIG. 11 in an actuated position.
Figure 16:
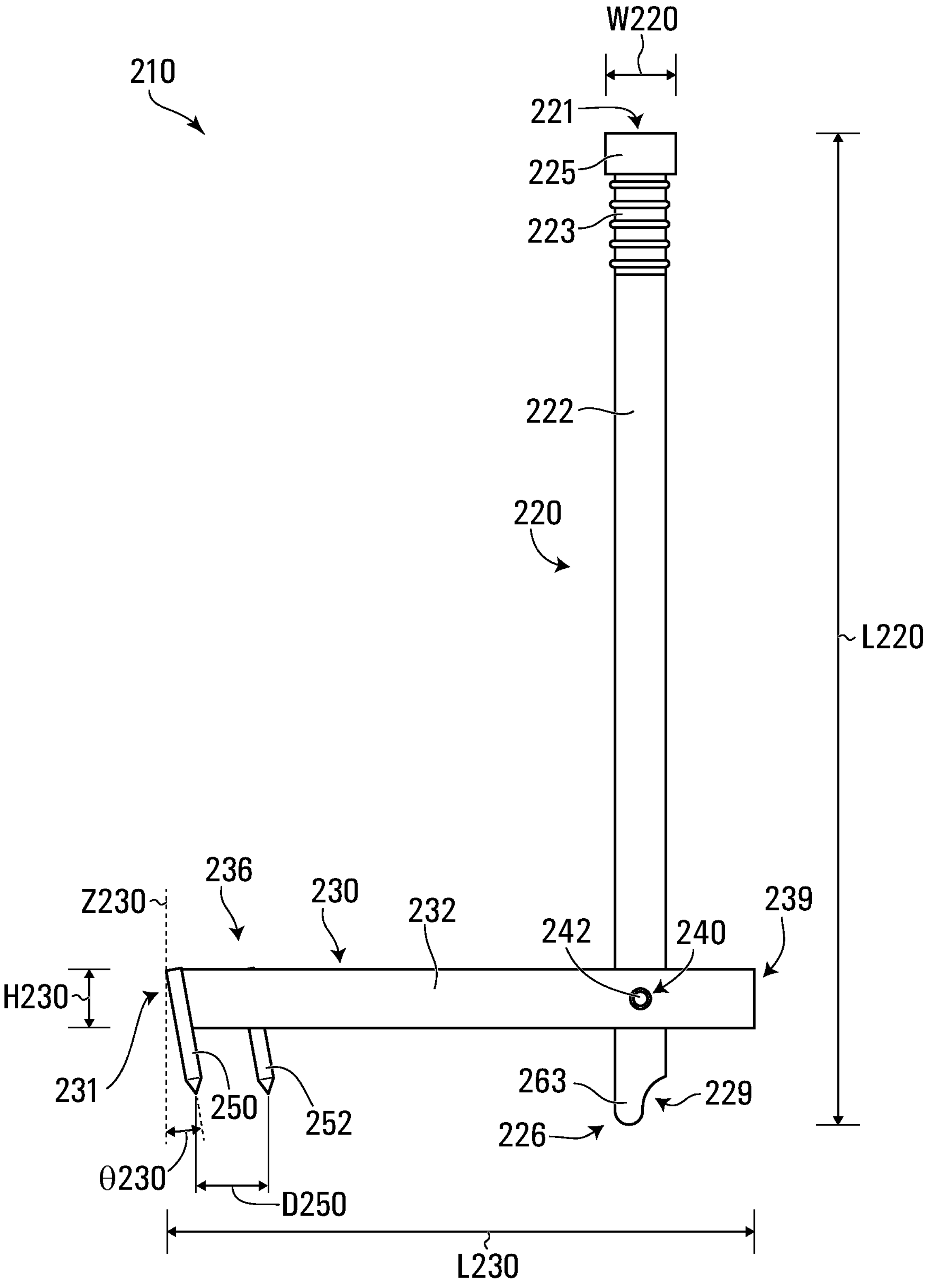
FIG. 16 is an elevation view of a construction tool with offset tooth points.
Figure 17:
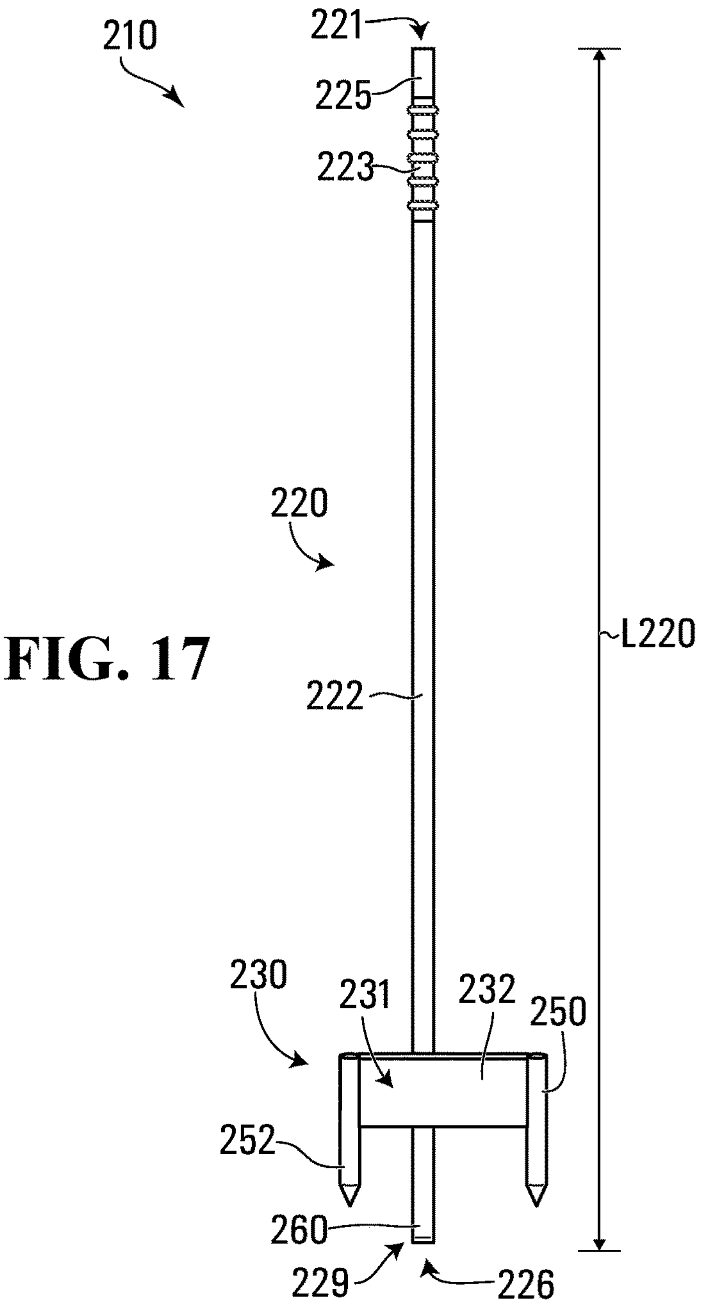
FIG. 17 is an elevation view of the tool of FIG. 16 rotated 90 degrees.
Figure 18:
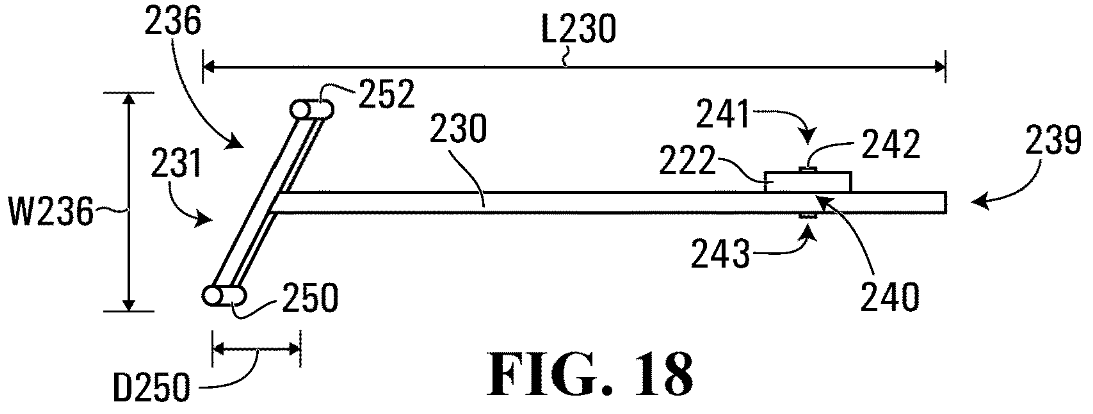
FIG. 18 is a plan view of the tool of FIG. 16.
Figure 19:
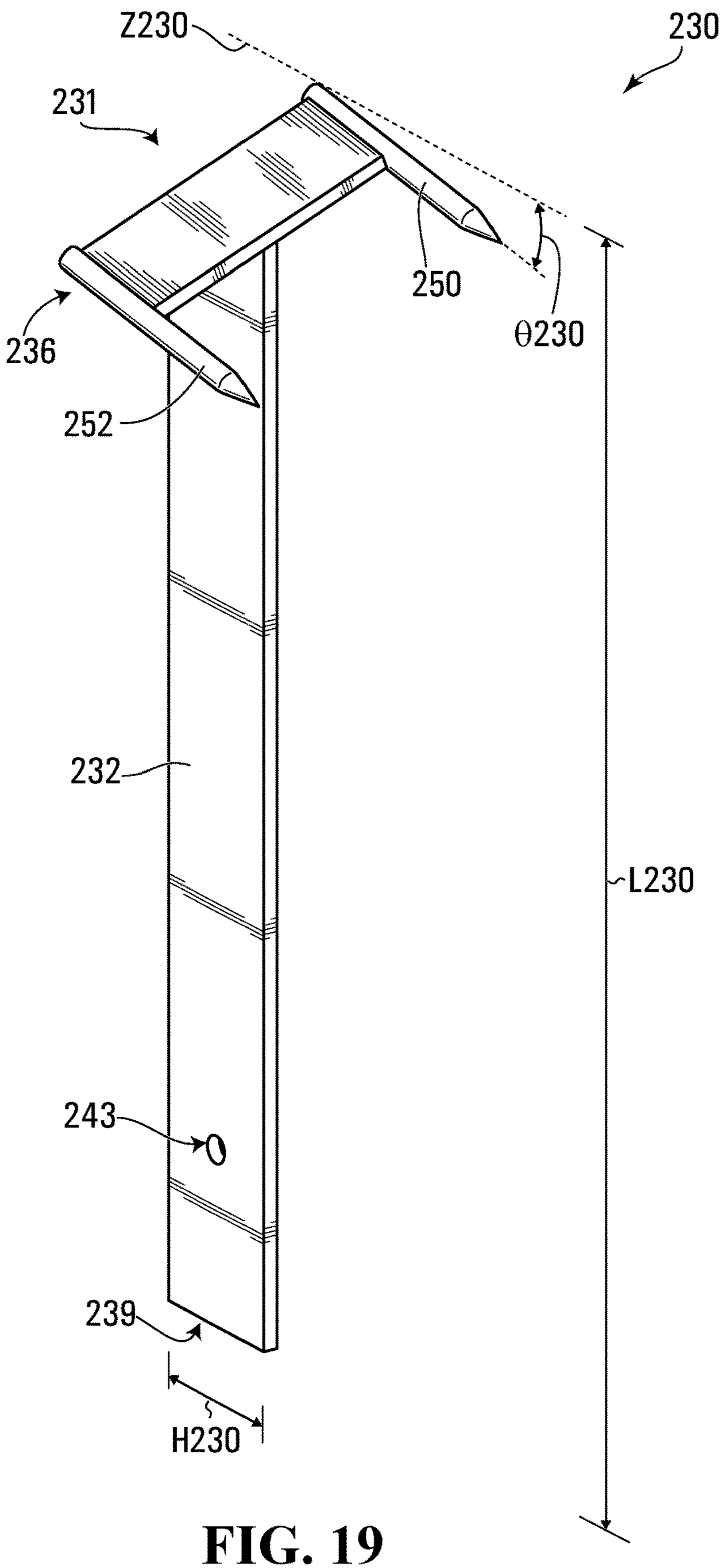
FIG. 19 is an isometric view of a claw head of the tool of FIG. 16.

The tooth angle θ130 is angled at an offset from the claw axis Z130, away from the first claw end 131 and toward the second claw end 139, for facilitating strong and resilient engagement of the tooth point 150, the claw head 136, the claw 130 and the tool 110 generally, with the wall frame or other workpiece. A strong and resilient engagement facilitates the tooth point 150, the claw head 136, the claw 130 and the tool 110 generally remaining engaged with the wall frame or other workpiece during pivoting of the handle 120 with respect to the claw 130, as shown in FIG. 15, or other manipulation of the tool 110, and accompanying urging of the claw 130 away from the wall frame or other work piece while the handle 120 is anchored with the floor or other underlying surface.

The tooth point 150 and the additional tooth point 152 are aligned along the claw length L130. Each of the tooth point 150 and the additional tooth point 152 angle back toward the second claw end 139 at an angle θ130. The tooth point 150 and the additional tooth point 152 are each angled the same angle θ130 from the claw axis Z130. The claw axis Z130 is perpendicular to the claw length L130 of the claw body 132 and parallel to the claw height H130 of the claw body 132. In other embodiments, the tooth point 150 may be angled at the angle θ130 from the vertical claw axis Z130 and the additional tooth point 152 may be angled at a different angle from the vertical claw axis Z130 than the angle θ130. In other embodiments, the additional tooth angle may be parallel with the claw axis Z130 or angled other than back toward the pivot 140.

The tooth point 150 may be located on the claw head 136 such that the tooth point 150 extends from the claw head 136 proximate the first end 131 of the claw body 132. The tooth point 150 extends from the claw head 136 at the tooth angle θ130 to facilitate effective and resilient engagement by the tooth point 150 with the wall frame or other workpiece during operation of the tool 110. The tooth angle θ130 is offset from the claw axis Z130 for orienting the tooth point 150 away from the first end 131 of the claw body 132, toward the pivot 140 and toward the second end 139 of the claw body 132. The tooth angle θ130 may be offset from the claw axis Z130 by an angle of about 2.5°, 5°, 7.5°, 10°, 12.5°, 15°, 17.5°, 20° or any suitable angle for easily and effectively penetrating the workpiece to provide an effective and resilient connection between the claw head 136 and the workpiece during operation of the tool 110.

The additional tooth point 152 may be defined on the claw head 136, be connected with the claw head 136 or otherwise located on the claw head 136 such that the additional tooth point extends from the claw head 136 proximate the first end 131 of the claw body 132. The additional tooth point 152 extends from the claw head at an additional tooth angle. Similarly to the tooth angle θ130, the additional tooth angle may be offset from the claw axis Z130 parallel to the claw height H130 of the claw 130, which claw height H130 is perpendicular to the claw length L130. Similarly to the tooth angle θ130, the additional tooth angle may offset from the at Z130 an angle that directs the additional tooth point 152 toward the pivot 140 and toward the second end 139 of the claw body 132 to facilitate effective and resilient engagement by the additional tooth point 152 with the wall frame or other workpiece during operation of the tool 130. The additional tooth angle may be offset from the claw axis Z130 by an angle of about 2.5°, 5°, 7.5°, 10°, 12.5°, 15°, 17.5°, 20° or any suitable additional tooth angle θ130. The additional tooth angle may be equal to the tooth angle θ130. In other embodiments, the additional tooth angle may be different from the tooth angle θ130. In other embodiments, the additional tooth angle may be parallel with the claw axis Z130 or angled other than back toward the pivot 140.

The pivot 140 is the connection point between the handle 120 and the claw 130. The pivot 140 includes the connection pin 142. The connection pin 142 is seated in the handle connection hole 141 through the handle body 122, and in the claw connection hole 143 in the claw body 132, at a tightness appropriate to allow the handle 120 to pivot with respect to the claw 130. The connection pin 142 may be a flanged pin or other suitable connection pin. The connection pin 142 may be seated within a bearing that is seated within the holes through the handle body 122 and the claw body 132 (bearing not shown).

The connection pin 142 may be removable to allow the construction tool 110 to be disassembled for storage and transportation, and to be sold as a kit of parts including the handle 120, the claw 130 and the connection pin 142, which may be assembled into the construction tool 110.

The height of the pivot 140 along the handle length L120 and the position of the pivot 140 along the claw length L130 may be selected based on an expected height for the claw 130 on the handle 120, and an expected distance between the handle 120 and a workpiece to which the claw 130 will be secured for a particular application. For example, the position of the pivot 140 may be selected to effectively allow positioning of standardized framing wall frames. In some embodiments, the first-story wall frame P02 in the method of FIGS. 9 and 10 may be a standardized wall frame. Positioning the pivot 140 lower along the handle length L120 toward the second handle end 129 or more distal from the workpiece along the claw length L130 toward the second claw end 139 may facilitate application of greater amounts of leverage on the handle 120 when the construction tool 110 is in use.

FIG. 15 shows the construction tool 110 in an actuated position. In the actuated position, the handle 120 has been pivoted to draw the first handle end 121 away from the claw head 136 and from the claw 130 generally. In the actuated position, the second handle end 129 is urged toward claw head 136. If the anchor 126 is secured with a floor or other underlying surface and the claw head 136 is secured with a house frame or other workpiece, then the handle 120 cannot freely pivot about the pivot 140 independently of the claw 130, and the claw head 136 will be pulled toward the pivot 140 when the tool 110 is actuated.

FIGS. 16 to 19 show the construction tool 210 in the resting position. The construction tool 210 includes the handle 220 connected with the claw 230 by the pivot 240. FIG. 6 shows the claw 230.

The handle 220 includes the handle body 222 extending along the handle length L220 between the first handle end 221 and the second handle end 229. In ordinary use, the first handle end 221 would be the top of the handle body 222 and the second handle end 229 would be the bottom of the handle body 222. The handle grip 223 and the handle guard 225 are located on the handle body 222 proximate the first handle end 221 for gripping and manipulating the construction tool 210 when in use. The anchor 226 is located on the handle body 222 proximate the second handle end 229 for anchoring the handle 220 with the floor or other underlying surface on which the tool 210 is deployed. The anchor 226 includes a stopper 263 for frictionally engaging with the underlying surface when the handle 220 is actuated away from the claw head 236. The stopper 263 anchors the handle 220 with the underlying surface without piercing the underlying surface and is suitable for use when piercing the underlying surface is not a practical option in the circumstances, such as when working on stone or concrete floors. The stopper 263 may include a locking wheel with a brake to prevent the wheel from rolling toward the claw head 236 when the handle 220 is actuated. The wheel may include a surface prepared from rubber or other material that is conducive to frictional engagement with a floor or other underlying surface, particularly where the floor or underlying surface is smooth.

The claw 230 includes the claw body 232 extending along the claw length L230 between the first claw end 231 and the second claw end 239. In ordinary use, the first claw end 231 would be the distal end of the claw body 232 from the user, and the second claw end 239 would be the proximal end of the claw body 232 to the user. The claw body 232 defines the claw height H230 that is perpendicular to the claw length L230. The claw head 236 is defined on the claw body 232 proximate the first claw end 231. The claw head defines the claw head width W236 that is perpendicular to the claw length L230 and to the claw height H230.

The claw head 236 includes the tooth point 250 and the additional tooth point 252. The tooth point 250 and the additional tooth point 252 are each located on the claw head 236 along the claw head width W236. The tooth point 250 extends from the claw head 236 in a configuration including at least a portion of the tooth point 250 extending from the claw head 236 at the tooth angle θ230 to pierce the wall frame or other workpiece along the tooth path. The tooth angle θ230 may be angled at an offset from the claw axis Z230. The claw axis Z230 is perpendicular to the claw length L230 of the claw body 132 and parallel to the claw height H230 of the claw body 132.

The tooth point 250 and the additional tooth point 252 are positioned and configured along the claw head 236 to offset the tooth point 250 from the additional tooth point 252 along the claw length L230. The tooth point 250 is offset from the additional tooth point 252 along the claw length L230 by an offset distance D250 between a terminus of the tooth point 250 and an additional terminus of the additional tooth point 250.

The offset distance D250 separating the tooth point 250 along the claw length L230 from the additional tooth point 252 facilitates forming and maintaining a strong and resilient engagement between the workpiece and the claw head 236 relative to a construction tool in which the tooth point is aligned with an additional tooth point along the claw length L230, such as the tooth point 150 and additional tooth point 152 of the tool 110. The offset distance D250 also facilitates the claw head 236 remaining engaged with the wall frame or other workpiece during manipulation of the tool 210. The offset distance D250 may also mitigate potential damage to the workpiece resulting from piercing of the workpiece by the tooth point 250 and the additional tooth point 252. The offset distance D250 may be between about 2.5 cm and about 10.0 cm, for example, about 1.5 cm, 2.0 cm, 2.5 cm, 3.0 cm, 3.5 cm, 4.0 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, 10.5 cm, and 11.0 cm.

Figure 20:
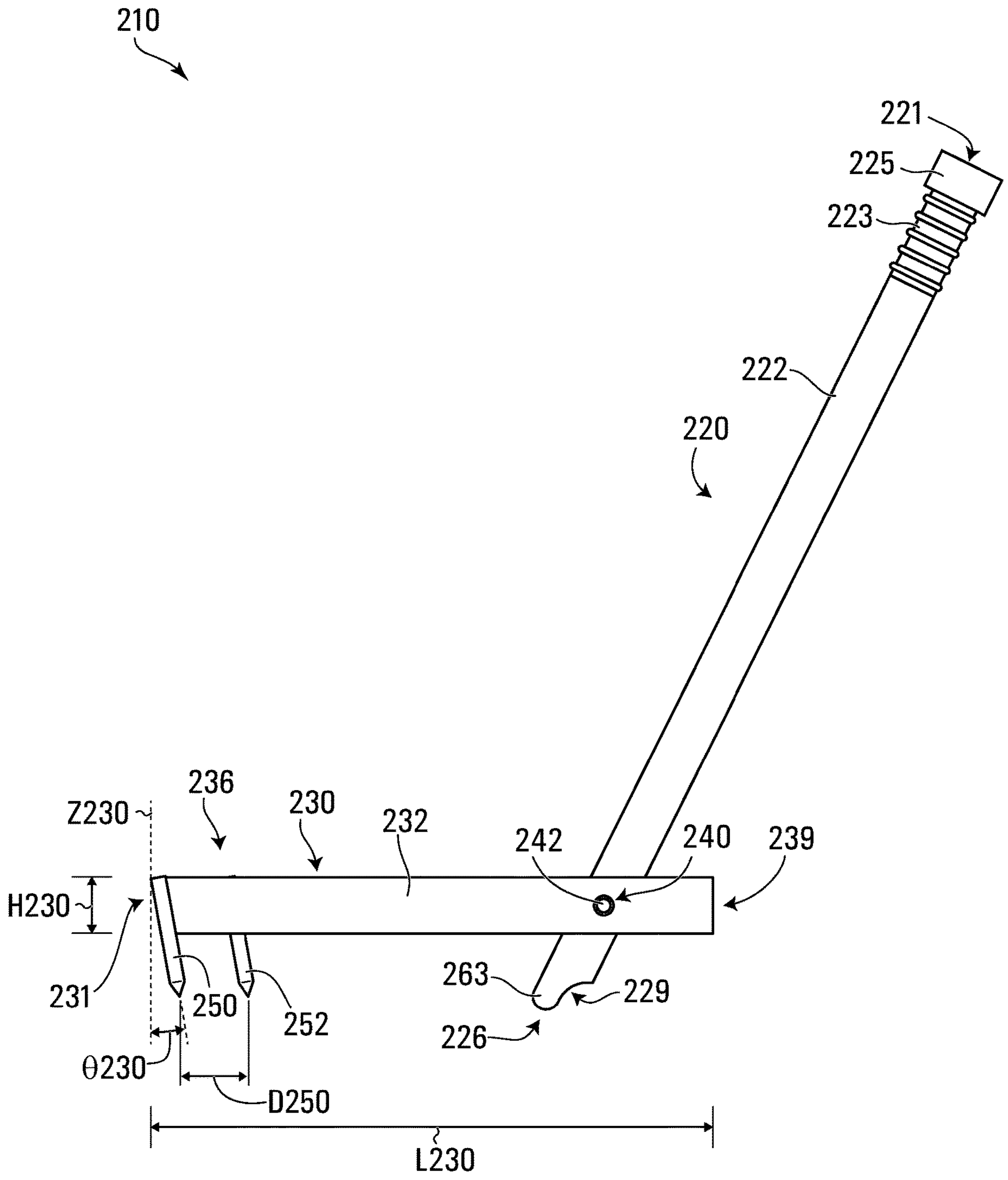
FIG. 20 is an elevation view of the tool of FIG. 16 in an actuated position.

The tooth angle θ230 is angled at an offset from the claw axis Z230, away from the first claw end 231 and toward the second claw end 239, for facilitating strong and resilient engagement of the tooth point 250, the claw head 236, the claw 230 and the tool 210 generally, with the wall frame or other workpiece. A strong and resilient engagement facilitates the tooth point 250, the claw head 236, the claw 230 and the tool 210 generally remaining engaged with the wall frame or other workpiece during pivoting of the handle 220 with respect to the claw 230, as shown in FIG. 20, or other manipulation of the tool 210, and accompanying urging of the claw 230 away from the wall frame or other work piece while the handle 220 is anchored with the floor or other underlying surface.

Each of the tooth point 250 and the additional tooth point 252 angle back toward the second claw end 239 at an angle θ230. The tooth point 250 and the additional tooth point 252 are each angled the same angle θ230 from the claw axis Z230. The claw axis Z230 is perpendicular to the claw length L230 of the claw body 232 and parallel to the claw height H230 of the claw body 232. In other embodiments, the tooth point 250 may be angled at the angle θ230 from the vertical claw axis Z230 and the additional tooth point 252 may be angled at a different angle from the vertical claw axis Z230 than the angle θ230. In other embodiments, the additional tooth angle may be parallel with the claw axis Z230 or angled other than back toward the pivot 240.

The tooth point 250 may be located on the claw head 236 such that the tooth point 250 extends from the claw head 236 proximate the first end 231 of the claw body 232. The tooth point 250 extends from the claw head 236 at the tooth angle θ230 to facilitate effective and resilient engagement by the tooth point 250 with the wall frame or other workpiece during operation of the tool 210. The tooth angle θ230 is offset from the claw axis Z230 for orienting the tooth point 250 away from the first end 231 of the claw body 232, toward the pivot 240 and toward the second end 239 of the claw body 232. The tooth angle θ230 may be offset from the claw axis Z230 by an angle of about 2.5°, 5°, 7.5°, 10°, 12.5°, 15°, 17.5°, 20° or any suitable angle for easily and effectively penetrating the workpiece to provide an effective and resilient connection between the claw head 236 and the workpiece during operation of the tool 210.

The additional tooth point 252 may be defined on the claw head 236, be connected with the claw head 236 or otherwise located on the claw head 236 such that the additional tooth point extends from the claw head 236 proximate the first end 231 of the claw body 232. The additional tooth point 252 extends from the claw head at an additional tooth angle. Similarly to the tooth angle θ230, the additional tooth angle may be offset from the claw axis Z230 parallel to the claw height H230 of the claw 230, which claw height H230 is perpendicular to the claw length L230. Similarly to the tooth angle θ230, the additional tooth angle may offset from the at Z230 an angle that directs the additional tooth point 252 toward the pivot 240 and toward the second end 239 of the claw body 232 to facilitate effective and resilient engagement by the additional tooth point 252 with the wall frame or other workpiece during operation of the tool 230. The additional tooth angle may be offset from the claw axis Z230 by an angle of about 2.5°, 5°, 7.5°, 10°, 12.5°, 15°, 17.5°, 20° or any suitable additional tooth angle θ230. The additional tooth angle may be equal to the tooth angle θ230. In other embodiments, the additional tooth angle may be different from the tooth angle θ230. In other embodiments, the additional tooth angle may be parallel with the claw axis Z230 or angled other than back toward the pivot 240.

The pivot 240 is the connection point between the handle 220 and the claw 230. The pivot 240 includes the connection pin 242. The connection pin 242 is seated in the handle connection hole 241 through the handle body 222, and in the claw connection hole 243 in the claw body 232, at a tightness appropriate to allow the handle 220 to pivot with respect to the claw 230. The connection pin 242 may be a flanged pin or other suitable connection pin. The connection pin 242 may be seated within a bearing that is seated within the holes through the handle body 222 and the claw body 232 (bearing not shown).

The connection pin 242 may be removable to allow the construction tool 210 to be disassembled for storage and transportation, and to be sold as a kit of parts including the handle 220, the claw 230 and the connection pin 242, which may be assembled into the construction tool 210.

The height of the pivot 240 along the handle length L220 and the position of the pivot 240 along the claw length L230 may be selected based on an expected height for the claw 230 on the handle 220, and an expected distance between the handle 220 and a workpiece to which the claw 230 will be secured for a particular application. For example, the position of the pivot 240 may be selected to effectively allow positioning of standardized framing wall frames. In some embodiments, the first-story wall frame P02 in the method of FIGS. 9 and 10 may be a standardized wall frame. Positioning the pivot 240 lower along the handle length L220 toward the second handle end 229 or more distal from the workpiece along the claw length L230 toward the second claw end 239 may facilitate application of greater amounts of leverage on the handle 220 when the construction tool 210 is in use.

FIG. 20 show the construction tool 210 in an actuated position. In the actuated position, the handle 220 has been pivoted to draw the first handle end 221 away from the claw head 236 and from the claw 230 generally. In the actuated position, the second handle end 229 is urged toward claw head 236. If the anchor 226 is secured with a floor or other underlying surface and the claw head 236 is secured with a house frame or other workpiece, then the handle 220 cannot freely pivot about the pivot 240 independently of the claw 230, and the claw head 236 will be pulled toward the pivot 240 when the tool 210 is actuated.

Figure 21:
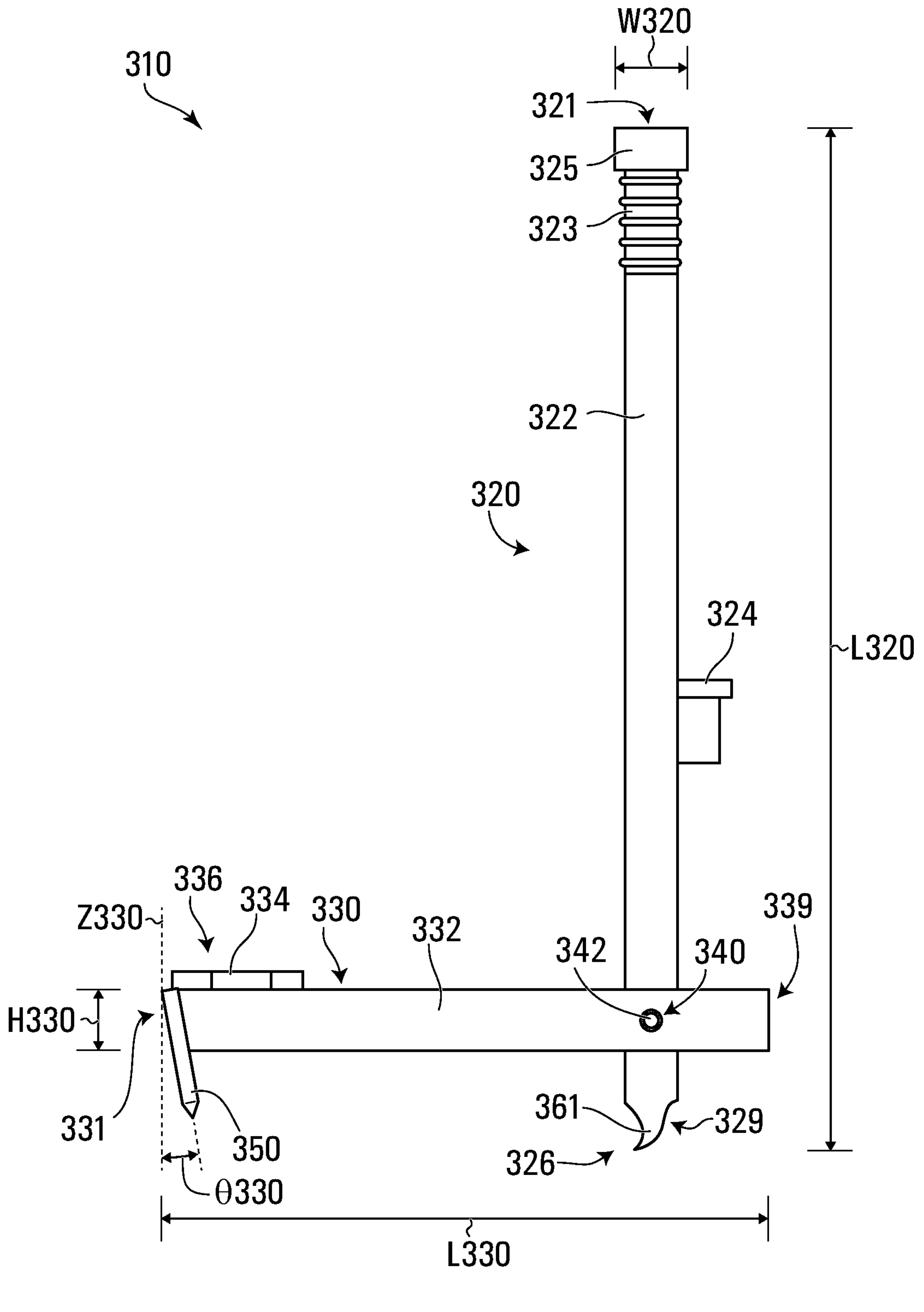
FIG. 21 is an elevation view of a construction tool with strike plates.

FIG. 21 shows a construction tool 310 in the resting position. The construction tool 310 includes the handle 320 connected with the claw 330 by the pivot 340. FIG. 6 shows the claw 330.

The handle 320 includes the handle body 322 extending along the handle length L320 between the first handle end 321 and the second handle end 329. In ordinary use, the first handle end 321 would be the top of the handle body 322 and the second handle end 329 would be the bottom of the handle body 322. The handle grip 323 and the handle guard 325 are located on the handle body 322 proximate the first handle end 321 for gripping and manipulating the construction tool 310 when in use. The anchor 326 is located on the handle body 322 proximate the second handle end 329 for anchoring the handle 320 with the floor or other underlying surface on which the tool 310 is deployed. A handle strike plate 324 is positioned on the handle body 322 intermediate the first handle end 321 and the second handle end 329 for receiving a blow from a hammer or other tool to secure the anchor 326 with the underlying surface.

The anchor 326 includes a spur 361 for piercing the floor or other underlying surface when engaging with the floor or other underlying surface for anchoring the handle with the floor or other underlying surface. The claw head 336 is positioned over a base timber of the first-story wall frame P02 then a hammer or other tool is used to apply force to the strike plate 334, forcing the claw head 336 into the first-story wall frame P02 and securing the claw 336 head with the first-story wall frame P02. The anchor 326 is positioned over the first-story floor P04 then a hammer or other tool is used to apply force to the strike plate 324, forcing the anchor 326 into the first-story floor P04, securing the anchor 326 with the first-story floor P04.

The claw 330 includes the claw body 332 extending along the claw length L330 between the first claw end 331 and the second claw end 339. In ordinary use, the first claw end 331 would be the distal end of the claw body 332 from the user, and the second claw end 339 would be the proximal end of the claw body 332 to the user. The claw body 332 defines the claw height H330 that is perpendicular to the claw length L330. The claw head 336 is defined on the claw body 332 proximate the first claw end 331. The claw head defines the claw head width W336 that is perpendicular to the claw length L330 and to the claw height H330. A claw strike plate 334 is positioned on the claw body 332 intermediate the first claw end 331 and the second claw end 339 and proximate to the claw head 336 for receiving a blow from a hammer or other tool to secure the claw head 336 with the workpiece.

The claw head 336 includes the single tooth point 350 located on the claw head 336 along the claw head width W336. The tooth point 350 extends from the claw head 336 in a configuration including at least a portion of the tooth point 350 extending from the claw head 336 at the tooth angle θ330 to pierce the wall frame or other workpiece along the tooth path. The tooth angle θ330 may be angled at an offset from the claw axis Z330. The claw axis Z330 is perpendicular to the claw length L330 of the claw body 332 and parallel to the claw height H330 of the claw body 332.

The tooth angle θ330 is angled at an offset from the claw axis Z330, away from the first claw end 331 and toward the second claw end 339, for facilitating strong and resilient engagement of the tooth point 350, the claw head 336, the claw 330 and the tool 310 generally, with the wall frame or other workpiece. A strong and resilient engagement facilitates the tooth point 350, the claw head 336, the claw 330 and the tool 310 generally remaining engaged with the wall frame or other workpiece during pivoting of the handle 320 with respect to the claw 330, as shown in FIG. 21, or other manipulation of the tool 310, and accompanying urging of the claw 330 away from the wall frame or other work piece while the handle 320 is anchored with the floor or other underlying surface.

The tooth point 350 may be located on the claw head 336 such that the tooth point 350 extends from the claw head 336 proximate the first end 331 of the claw body 332. The tooth point 350 extends from the claw head 336 at the tooth angle θ330 to facilitate effective and resilient engagement by the tooth point 350 with the wall frame or other workpiece during operation of the tool 310. The tooth angle θ330 is offset from the claw axis Z330 for orienting the tooth point 350 away from the first end 331 of the claw body 332, toward the pivot 340 and toward the second end 339 of the claw body 332. The tooth angle θ330 may be offset from the claw axis Z330 by an angle of about 2.5°, 5°, 7.5°, 10°, 12.5°, 15°, 17.5°, 20° or any suitable angle for easily and effectively penetrating the workpiece to provide an effective and resilient connection between the claw head 336 and the workpiece during operation of the tool 310.

The pivot 340 is the connection point between the handle 320 and the claw 330. The pivot 340 includes the connection pin 342. The connection pin 342 is seated in the handle connection hole 341 through the handle body 322, and in the claw connection hole 343 in the claw body 332, at a tightness appropriate to allow the handle 320 to pivot with respect to the claw 330. The connection pin 342 may be a flanged pin or other suitable connection pin. The connection pin 342 may be seated within a bearing that is seated within the holes through the handle body 322 and the claw body 332 (bearing not shown).

The connection pin 342 may be removable to allow the construction tool 310 to be disassembled for storage and transportation, and to be sold as a kit of parts including the handle 320, the claw 330 and the connection pin 342, which may be assembled into the construction tool 310.

The height of the pivot 340 along the handle length L320 and the position of the pivot 340 along the claw length L330 may be selected based on an expected height for the claw 330 on the handle 320, and an expected distance between the handle 320 and a workpiece to which the claw 330 will be secured for a particular application. For example, the position of the pivot 340 may be selected to effectively allow positioning of standardized framing wall frames. In some embodiments, the first-story wall frame P02 in the method of FIGS. 9 and 10 may be a standardized wall frame. Positioning the pivot 340 lower along the handle length L320 toward the second handle end 329 or more distal from the workpiece along the claw length L330 toward the second claw end 339 may facilitate application of greater amounts of leverage on the handle 320 when the construction tool 310 is in use.

Figure 22:
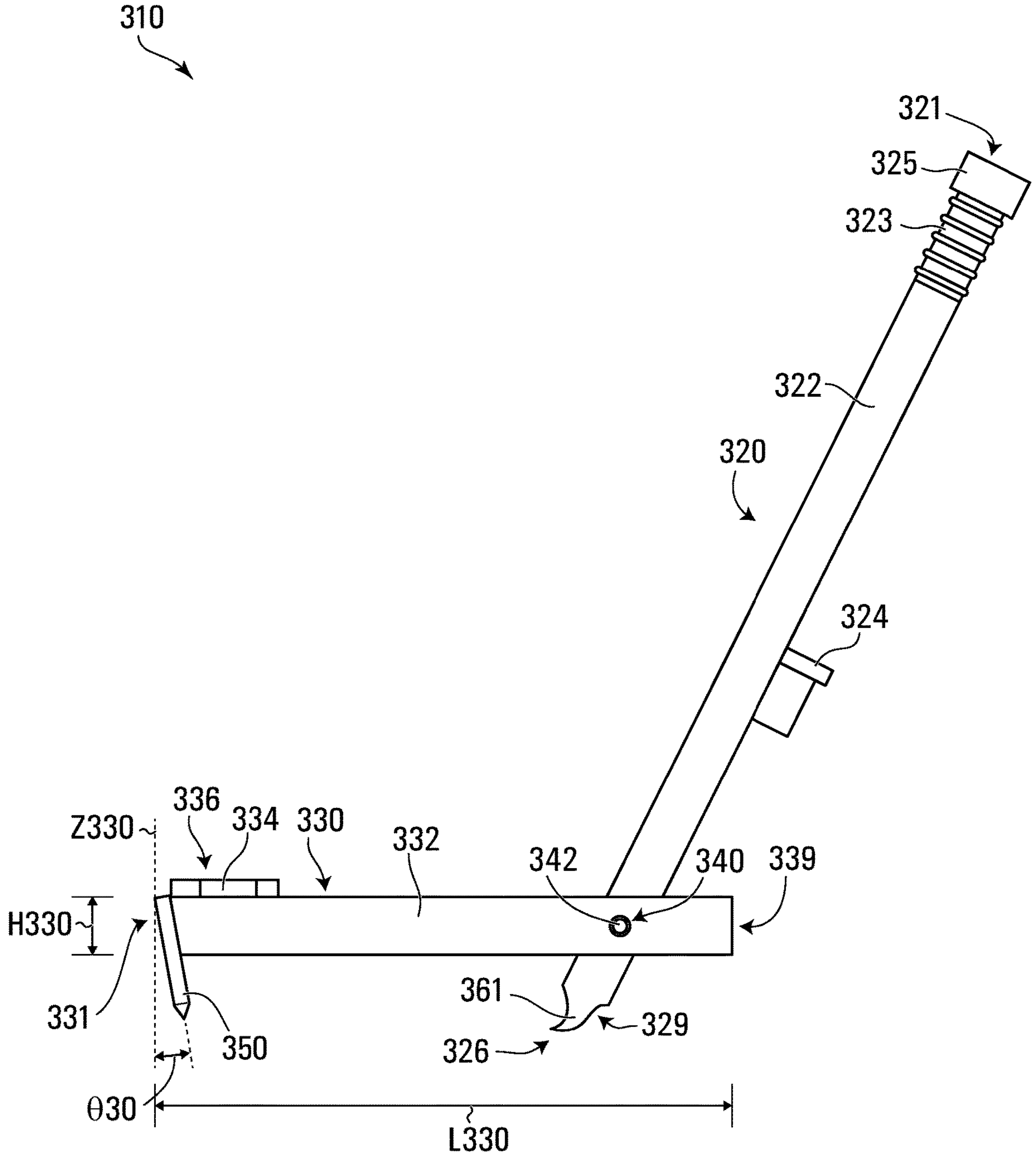
FIG. 22 is an elevation view of the tool of FIG. 21 in an actuated position.
Figure 23:
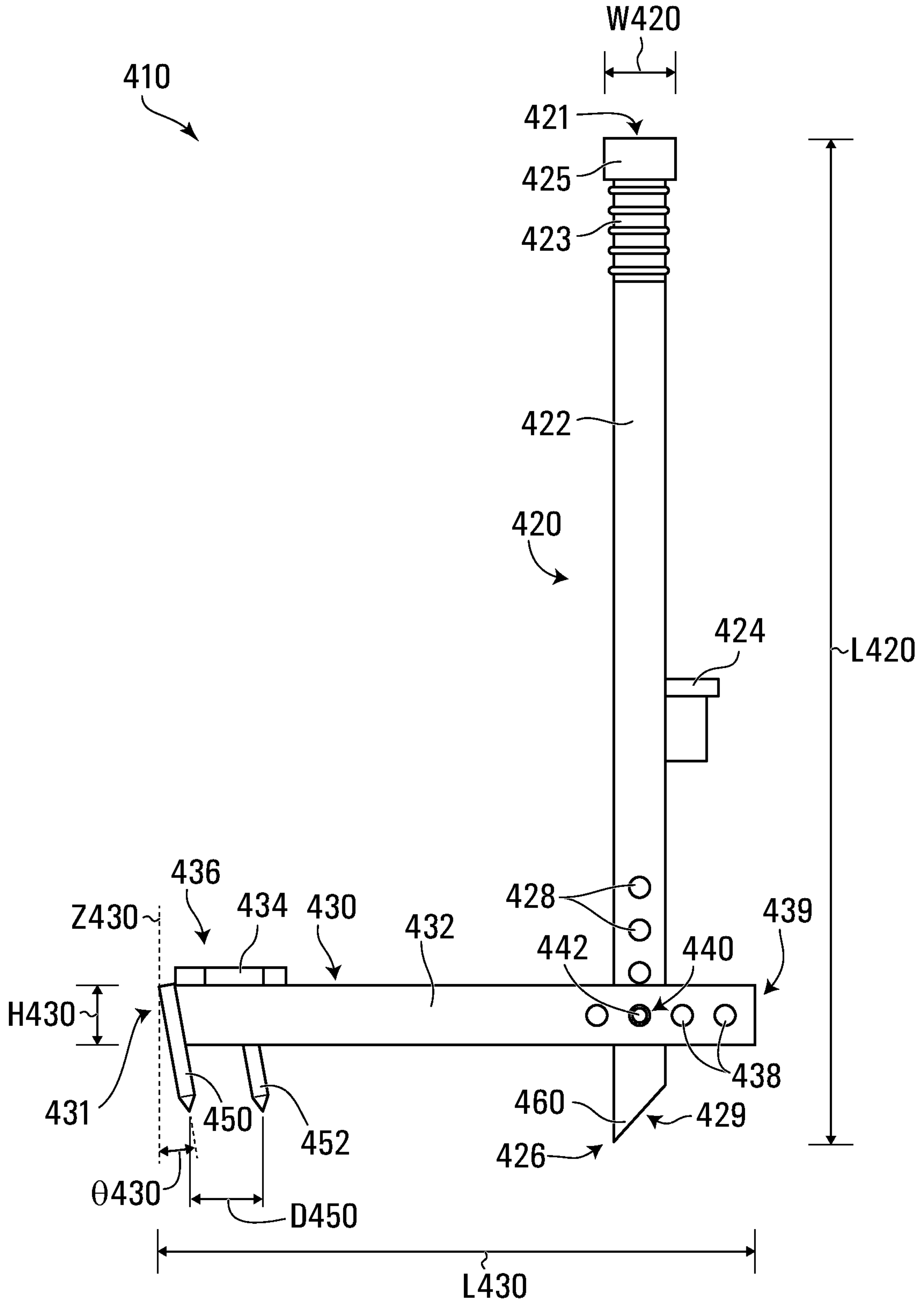
FIG. 23 is an elevation view of a construction tool with an adjustable pivot.
Figure 24:
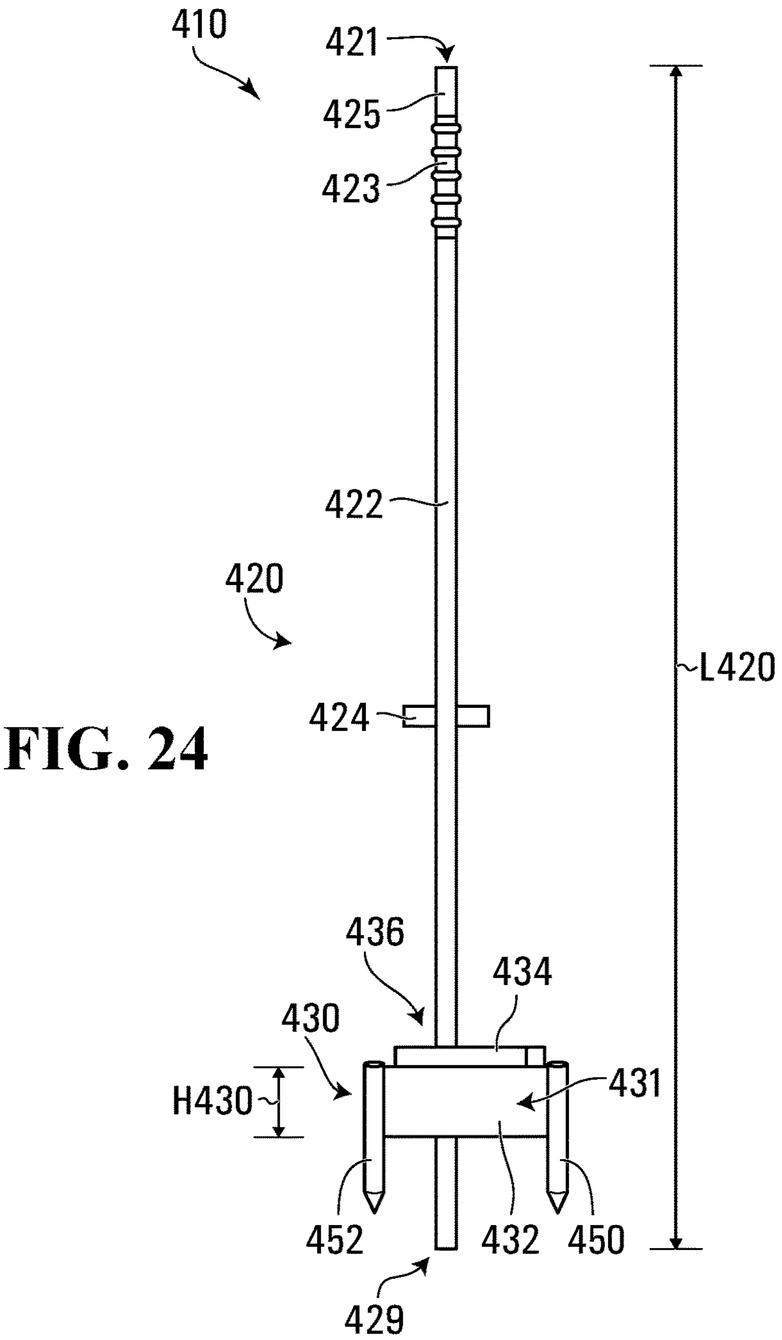
FIG. 24 is an elevation view of the tool of FIG. 23 rotated 90 degrees.
Figure 25:
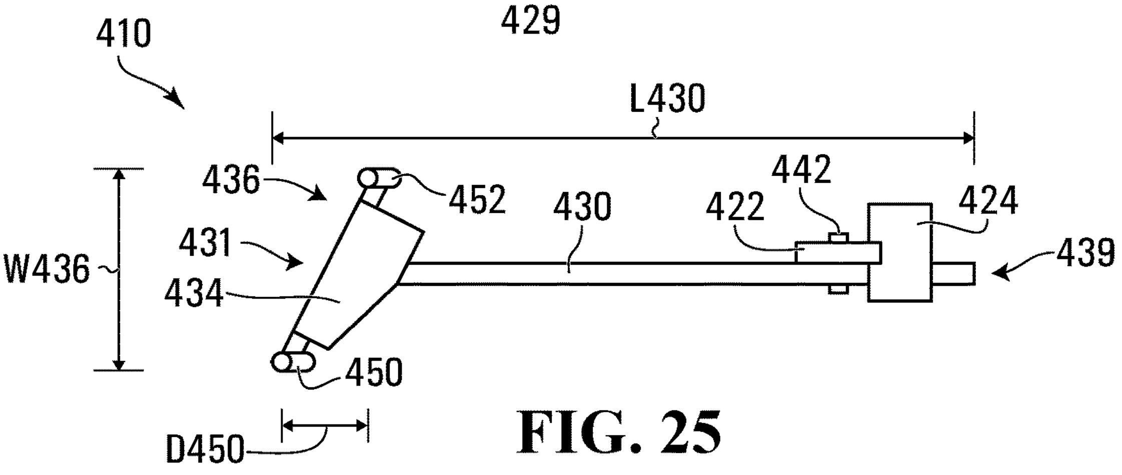
FIG. 25 is a plan view of the tool of FIG. 23.
Figure 26:
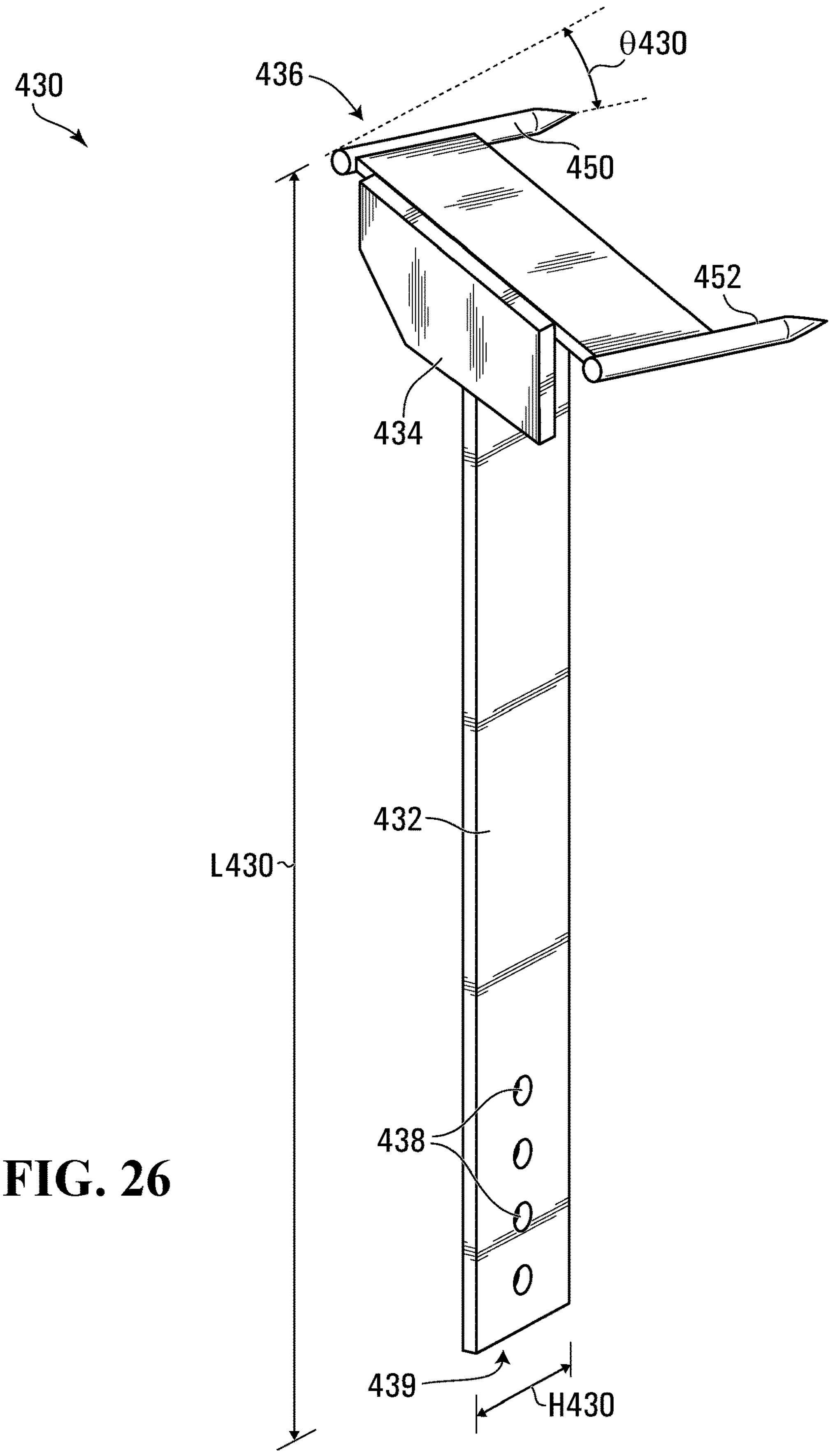
FIG. 26 is an isometric view of a claw head of the tool of FIG. 23.

FIG. 22 show the construction tool 310 in an actuated position. In the actuated position, the handle 320 has been pivoted to draw the first handle end 321 away from the claw head 336 and from the claw 330 generally. In the actuated position, the second handle end 329 is urged toward claw head 336. If the anchor 326 is secured with a floor or other underlying surface and the claw head 336 is secured with a house frame or other workpiece, then the handle 320 cannot freely pivot about the pivot 340 independently of the claw 330, and the claw head 336 will be pulled toward the pivot 340 when the tool 310 is actuated.

FIGS. 23 to 26 show a construction tool 410 in the resting position. The construction tool 410 includes the handle 420 connected with the claw 430 by the pivot 440. FIG. 6 shows the claw 430.

The handle 420 includes the handle body 422 extending along the handle length L420 between the first handle end 421 and the second handle end 429. In ordinary use, the first handle end 421 would be the top of the handle body 422 and the second handle end 429 would be the bottom of the handle body 422. The handle grip 423 and the handle guard 425 are located on the handle body 422 proximate the first handle end 421 for gripping and manipulating the construction tool 410 when in use. The anchor 426 is located on the handle body 422 proximate the second handle end 429 for anchoring the handle 420 with the floor or other underlying surface on which the tool 410 is deployed. The anchor 426 includes a spike 460 for piercing the floor or other underlying surface when engaging with the floor or other underlying surface for anchoring the handle with the floor or other underlying surface. The handle strike plate 424 is positioned on the handle body 422 intermediate the first handle end 421 and the second handle end 429 for receiving a blow from a hammer or other tool to secure the anchor 426 with the underlying surface.

The claw head 436 is positioned over a base timber of the first-story wall frame P02 then a hammer or other tool is used to apply force to the claw strike plate 434, forcing the claw head 436 into the first-story wall frame P02 and securing the claw 436 head with the first-story wall frame P02. The anchor 426 is positioned over the first-story floor P04 then a hammer or other tool is used to apply force to the handle strike plate 424, forcing the anchor 426 into the first-story floor P04, securing the anchor 426 with the first-story floor P04.

The claw 430 includes the claw body 432 extending along the claw length L430 between the first claw end 431 and the second claw end 439. In ordinary use, the first claw end 431 would be the distal end of the claw body 432 from the user, and the second claw end 439 would be the proximal end of the claw body 432 to the user. The claw body 432 defines the claw height H430 that is perpendicular to the claw length L430.

The claw head 436 is defined on the claw body 432 proximate the first claw end 431. The claw head defines the claw head width W436 that is perpendicular to the claw length L430 and to the claw height H430. The claw strike plate 434 is positioned on the claw body 432 intermediate the first claw end 431 and the second claw end 439 and proximate to the claw head 436 for receiving a blow from a hammer or other tool to secure the claw head 436 with the workpiece.

The claw head 436 includes the tooth point 450 and an additional tooth point 452. The tooth point 450 and the additional tooth point 452 are each located on the claw head 436 along the claw head width W436. The tooth point 450 extends from the claw head 436 in a configuration including at least a portion of the tooth point 450 extending from the claw head 436 at the tooth angle θ430 to pierce the wall frame or other workpiece along the tooth path. The tooth angle θ430 may be angled at an offset from the claw axis Z430. The claw axis Z430 is perpendicular to the claw length L430 of the claw body 432 and parallel to the claw height H430 of the claw body 132.

The tooth point 450 and the additional tooth point 452 are positioned and configured along the claw head 436 to offset the tooth point 450 from the additional tooth point 452 along the claw length L230. The tooth point 450 is offset from the additional tooth point 452 along the claw length L230 by an offset distance D450 between a terminus of the tooth point 450 and an additional terminus of the additional tooth point 450. The offset distance D450 may for example be between about 2.5 cm and about 10.0 cm, for example, about 1.5 cm, 2.0 cm, 2.5 cm, 3.0 cm, 3.5 cm, 4.0 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, 10.5 cm, and 11.0 cm.

The offset distance D450 separating the tooth point 450 along the claw length L230 from the additional tooth point 452 facilitates forming and maintaining a strong and resilient engagement between the workpiece and the claw head 436 relative to a construction tool in which the tooth point is aligned with an additional tooth point along the claw length L230, such as the tooth point 150 and additional tooth point 152 of the tool 110. The offset distance D450 also facilitates the claw head 436 remaining engaged with the wall frame or other workpiece during manipulation of the tool 410. The offset distance D450 may also mitigate potential damage to the workpiece resulting from piercing of the workpiece by the tooth point 450 and the additional tooth point 452.

Figure 27:
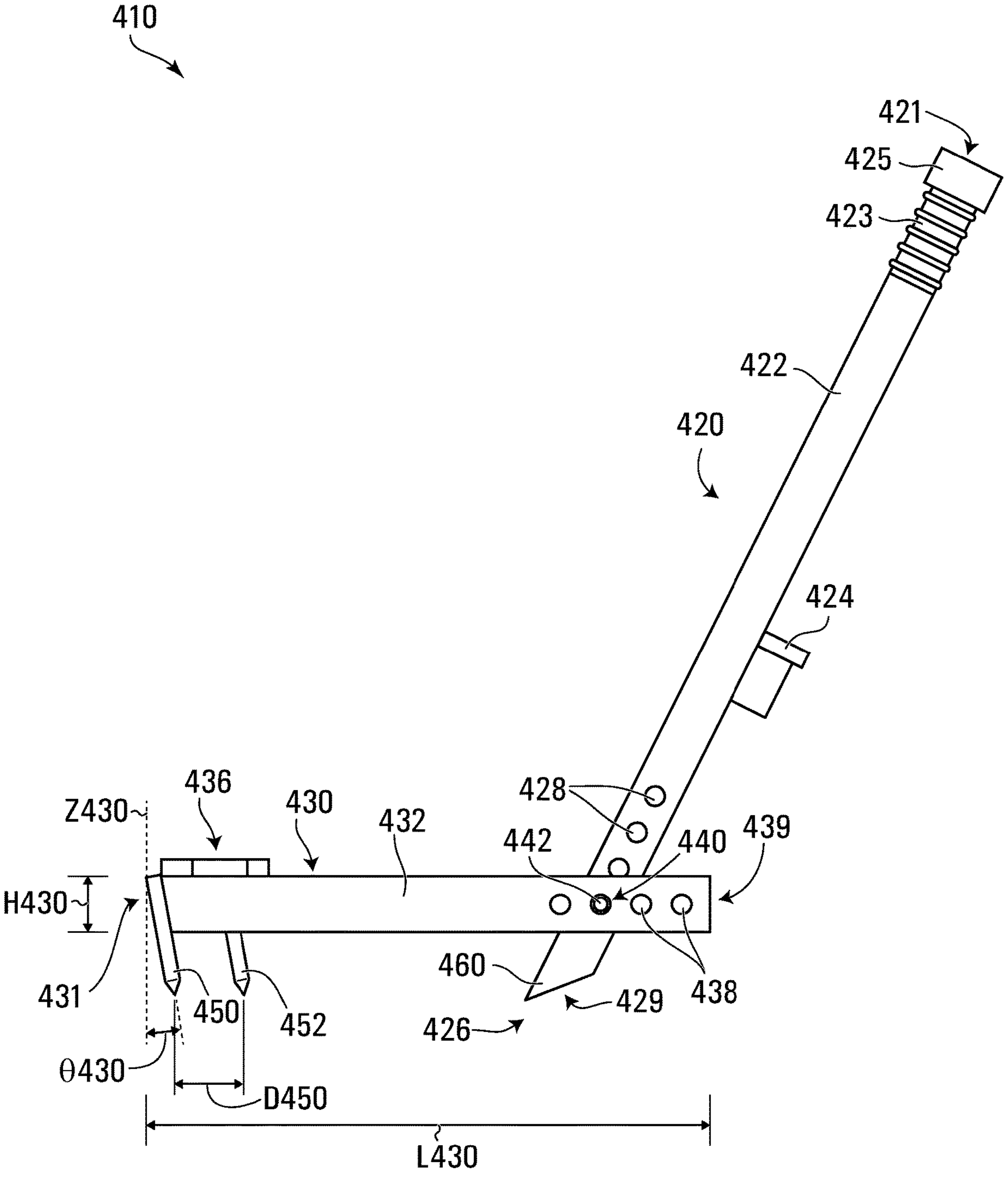
FIG. 27 is an elevation view of the tool of FIG. 23 in an actuated position.
Figure 28:
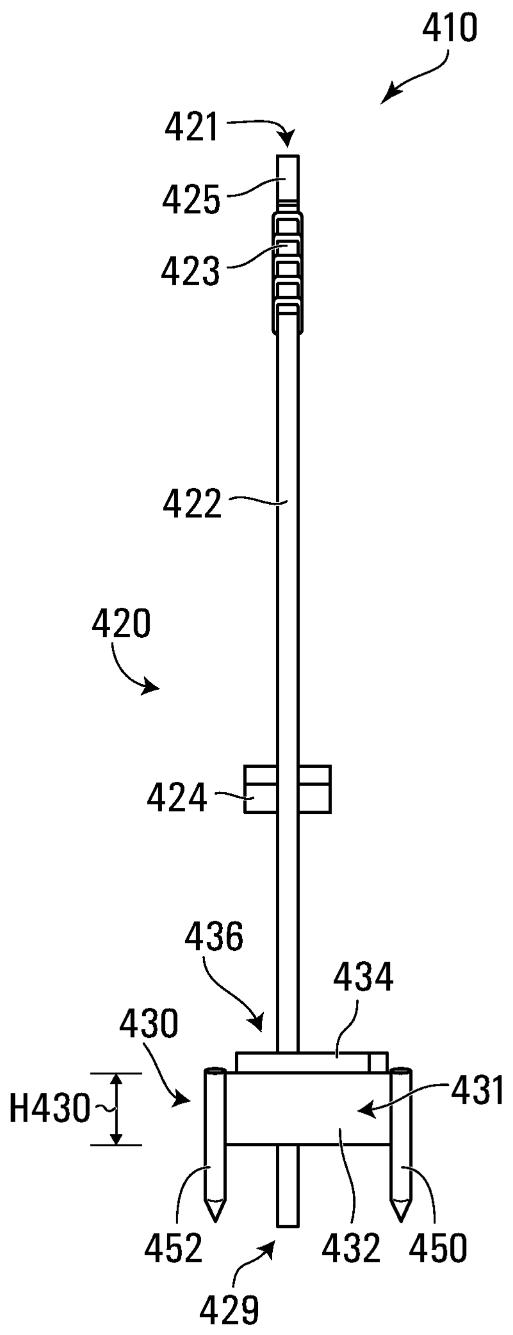
FIG. 28 is an elevation view of the tool of FIG. 23 rotated 90 degrees in the actuated position.

The tooth angle θ430 is angled at an offset from the claw axis Z430, away from the first claw end 431 and toward the second claw end 439, for facilitating strong and resilient engagement of the tooth point 450, the claw head 436, the claw 430 and the tool 410 generally, with the wall frame or other workpiece. A strong and resilient engagement facilitates the tooth point 450, the claw head 436, the claw 430 and the tool 410 generally remaining engaged with the wall frame or other workpiece during pivoting of the handle 420 with respect to the claw 430, as shown in FIGS. 27 and 28, or other manipulation of the tool 410, and accompanying urging of the claw 430 away from the wall frame or other work piece while the handle 420 is anchored with the floor or other underlying surface.

Each of the tooth point 450 and the additional tooth point 452 angle back toward the second claw end 439 at an angle θ430. The tooth point 450 and the additional tooth point 452 are each angled the same angle θ430 from the claw axis Z430. The claw axis Z430 is perpendicular to the claw length L430 of the claw body 432 and parallel to the claw height H430 of the claw body 432. In other embodiments, the tooth point 450 may be angled at the angle θ430 from the vertical claw axis Z430 and the additional tooth point 452 may be angled at a different angle from the vertical claw axis Z430 than the angle θ430. In other embodiments, the additional tooth angle may be parallel with the claw axis Z430 or angled other than back toward the pivot 440.

The tooth point 450 may be located on the claw head 436 such that the tooth point 450 extends from the claw head 436 proximate the first end 431 of the claw body 432. The tooth point 450 extends from the claw head 436 at the tooth angle θ430 to facilitate effective and resilient engagement by the tooth point 450 with the wall frame or other workpiece during operation of the tool 410. The tooth angle θ430 is offset from the claw axis Z430. The tooth angle θ430 is offset from the claw axis Z430 for orienting the tooth point 450 away from the first end 431 of the claw body 432, toward the pivot 440 and toward the second end 439 of the claw body 432. The tooth angle θ430 may be offset from the claw axis Z430 by an angle of about 2.5°, 5°, 7.5°, 10°, 12.5°, 15°, 17.5°, 20° or any suitable angle for easily and effectively penetrating the workpiece to provide an effective and resilient connection between the claw head 436 and the workpiece during operation of the tool 410.

The additional tooth point 452 may be defined on the claw head 436, be connected with the claw head 436 or otherwise located on the claw head 436 such that the additional tooth point extends from the claw head 436 proximate the first end 431 of the claw body 432. The additional tooth point 452 extends from the claw head at an additional tooth angle. Similarly to the tooth angle θ430, the additional tooth angle may be offset from the claw axis Z430 parallel to the claw height H430 of the claw 430, which claw height H430 is perpendicular to the claw length L430. Similarly to the tooth angle θ430, the additional tooth angle may offset from the at Z430 an angle that directs the additional tooth point 452 toward the pivot 440 and toward the second end 439 of the claw body 432 to facilitate effective and resilient engagement by the additional tooth point 452 with the wall frame or other workpiece during operation of the tool 430. The additional tooth angle may be offset from the claw axis Z430 by an angle of about 2.5°, 5°, 7.5°, 10°, 12.5°, 15°, 17.5°, 20° or any suitable additional tooth angle θ430. The additional tooth angle may be equal to the tooth angle θ430. In other embodiments, the additional tooth angle may be different from the tooth angle θ430. In other embodiments, the additional tooth angle may be parallel with the claw axis Z430 or angled other than back toward the pivot 440.

The connection pin 442 may be removable to allow the construction tool 410 to be disassembled for storage and transportation, and to be sold as a kit of parts including the handle 420, the claw 430 and the connection pin 442, which may be assembled into the construction tool 410.

Intermediate the first handle end 421 and the second handle end 429 are a plurality of handle adjustment holes 428, each of which may serve as a connection point between the handle 420 and the claw 430 to form the pivot 440.

Intermediate the first claw end 431 and second claw end 439 are a plurality of claw adjustment holes 438, each of which may serve as a connection point between the claw 430 and the handle 420 to form the pivot 440.

The pivot 440 is a selectable connection point between the handle 420 and the claw 430. The pivot 440 includes one of the handle adjustment holes 428, one of the claw adjustment holes 438 and a connection pin 442. The connection pin 442 is seated in the selected handle adjustment hole 428 and the selected claw adjustment hole 438 at a tightness appropriate to allow the handle 420 to pivot with respect to the claw 430. The connection pin 442 may be a flanged pin or other suitable connection pin. The connection pin 442 may be seated within a bearing that is located in the handle adjustment hole 428 and the claw adjustment hole 438 (not shown).

The height of the pivot 440 along the handle length L420 and the position of the pivot 440 along the claw length L430 may be selected based on an expected height for the claw 430 on the handle 420, and an expected distance between the handle 420 and a workpiece to which the claw 430 will be secured for a particular application. For example, the position of the pivot 440 may be selected to effectively allow positioning of standardized framing wall frames. In some embodiments, the first-story wall frame P02 in the method of FIGS. 9 and 10 may be a standardized wall frame. Positioning the pivot 440 lower along the handle length L420 toward the second handle end 429 or more distal from the workpiece along the claw length L430 toward the second claw end 439 may facilitate application of greater amounts of leverage on the handle 420 when the construction tool 410 is in use.

FIGS. 27 and 28 show the construction tool 410 in an actuated position. In the actuated position, the handle 420 has been pivoted to draw the first handle end 421 away from the claw head 436 and from the claw 430 generally. In the actuated position, the second handle end 429 is urged toward claw head 436. If the anchor 426 is secured with a floor or other underlying surface and the claw head 436 is secured with a house frame or other workpiece, then the handle 420 cannot freely pivot about the pivot 440 independently of the claw 430, and the claw head 436 will be pulled toward the pivot 440 when the tool 410 is actuated.

EXAMPLES ONLY

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A construction tool comprising:

a handle body extending between a first handle end and a second handle end;

a claw body extending along a claw length of the claw body between a first claw end and a second claw end, the claw body connected with the handle body by a pivot proximate the second handle end and proximate the second claw end for pivoting the handle body with respect to the claw body;

an anchor located on the handle body proximate the second handle end for securing the handle body with an underlying surface;

a claw head located on the claw body proximate the first claw end for engaging with a workpiece; and a tooth point extending from the claw head at a tooth angle for piercing the workpiece; and wherein the tooth angle is offset from a tooth axis perpendicular to the claw length, and angled away from the first claw end and toward the second claw end for facilitating engagement between the tooth point and the workpiece along a tooth path within the workpiece, which tooth path is directed away from the first claw end and toward the second claw end.

2. The construction tool of claim 1 wherein the anchor is configured to secure the handle body with the underlying surface by penetrating the underlying surface.

3. The construction tool of claim 1 wherein the anchor is configured to secure the handle body with the underlying surface by frictionally engaging the underlying surface.

4. The construction tool of claim 1 wherein the tooth angle is offset from the tooth axis by up to about 20°.

5. The construction tool of claim 4 wherein the tooth angle is offset from the tooth axis by an angle selected from the group consisting of 2.5°, 5°, 7.5°, 10°, 12.5°, 15°, 17.5° and 20°.

6. The construction tool of claim 1 further comprising a handle strike plate located on the handle body for receiving a forceful blow to facilitate engaging the anchor with the underlying surface.

7. The construction tool of claim 6 wherein the handle strike plate is located along the handle body intermediate the first body end and the pivot.

8. The construction tool of claim 6 wherein the handle strike plate is located along the handle body intermediate the second body end and the pivot.

9. The construction tool of claim 1 further comprising a claw strike plate located on the claw body intermediate the first body end and the pivot for receiving a forceful blow to facilitate engaging the tooth point with the workpiece.

10. The construction tool of claim 1 wherein the pivot is configured for disassembling the tool by disconnecting the handle body from the claw body and reassembling the tool by connecting the handle body with the claw body.

11. The construction tool of claim 10 further comprising a plurality of handle adjustment holes defined in the handle body proximate the second handle end;

wherein the pivot comprises one of the handle adjustment holes; and the construction tool is configured to be assembled with the pivot comprising any one of the handle adjustment holes for selecting a position along the handle body for the pivot.

12. The construction tool of claim 10 further comprising a plurality of claw adjustment holes defined in the claw body proximate the second claw end;

wherein the pivot comprises one of the claw adjustment holes; and the construction tool is configured to be assembled with the pivot comprising any one of the claw adjustment holes for selecting a position along the claw body for the pivot.

13. The construction tool of claim 1 further comprising an additional tooth point extending from the claw head at an additional tooth angle for piercing the workpiece along an additional tooth path corresponding to the additional tooth angle.

14. The construction tool of claim 13 wherein the additional tooth point is separated from the tooth point along the claw body by an offset distance for offsetting a location on the workpiece at which the tooth point engages with the workpiece from an additional location on the workpiece at which the additional tooth point engages with the workpiece.

15. The construction tool of claim 14 wherein the offset distance is a selected from the group consisting of 1.5 cm, 2.0 cm, 2.5 cm, 3.0 cm, 3.5 cm, 4.0 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, 10.5 cm, and 11.0 cm.

16. The construction tool of claim 13 wherein the additional tooth angle is parallel to the additional tooth axis.

17. The construction tool of claim 13 wherein the additional tooth angle is offset from an additional tooth axis perpendicular to the claw length, and angled away from the first claw end and toward the second claw end for defining the additional tooth path within the workpiece directed away from the first claw end and toward the second claw end.

18. The construction tool of claim 17 wherein the additional tooth angle is equal to the tooth angle.

19. The construction tool of claim 17 wherein the additional tooth angle is offset from the additional tooth axis by up to about 20°.

20. The construction tool of claim 19 wherein the additional tooth angle is offset from the additional tooth axis by an additional angle selected from the group consisting of 2.5°, 5°, 7.5°, 10°, 12.5°, 15°, 17.5° and 20°.

21. A method of securing a workpiece comprising:

providing a tool comprising a claw engaged with a handle by a pivot, the handle including an anchor below the pivot;

engaging the claw with the workpiece;

engaging the anchor with an underlying surface; and pivoting the handle with respect to the claw for urging the workpiece toward the pivot;

wherein the claw comprises a tooth point extending from the claw at a tooth angle for piercing the workpiece; and the tooth angle is offset from a tooth axis perpendicular to a claw length extending along the claw between the tooth and the pivot, and the tooth angle is angled toward the pivot for facilitating engagement between the tooth point and the workpiece along a tooth path within the workpiece, which tooth path is directed toward the pivot.

22. The method of claim 21 wherein the workpiece comprises a wall frame.

23. The method of claim 21 wherein engaging the claw with the workpiece comprises striking the claw with a blunt tool.

24. The method of claim 21 wherein engaging the anchor with the underlying surface comprises piercing the underlying surface with the anchor.

25. The method of claim 24 wherein engaging the claw with the workpiece comprises striking the claw with a blunt tool.

26. The method of claim 21 wherein engaging the anchor with the underlying surface comprises frictionally engaging the underlying surface with the anchor.

27. The method of claim 21 further comprising selecting a height of the claw prior to engaging the claw with the workpiece.

28. The method of claim 21 further comprising selecting a distance from the tooth point to the pivot along the claw prior to engaging the claw with the workpiece.

* * * * *